Oct. 9, 1951 A. L. KRONQUEST 2,570,956
VACUUMIZING AND CLOSING MACHINE WITH ROTARY BELL TURRET,
VERTICALLY MOVABLE, CAN SUPPORTING, BELL CLOSING PADS,
AND PAD MOVEMENT RATE CONTROL MEANS
Filed Dec. 4, 1943 16 Sheets-Sheet 7
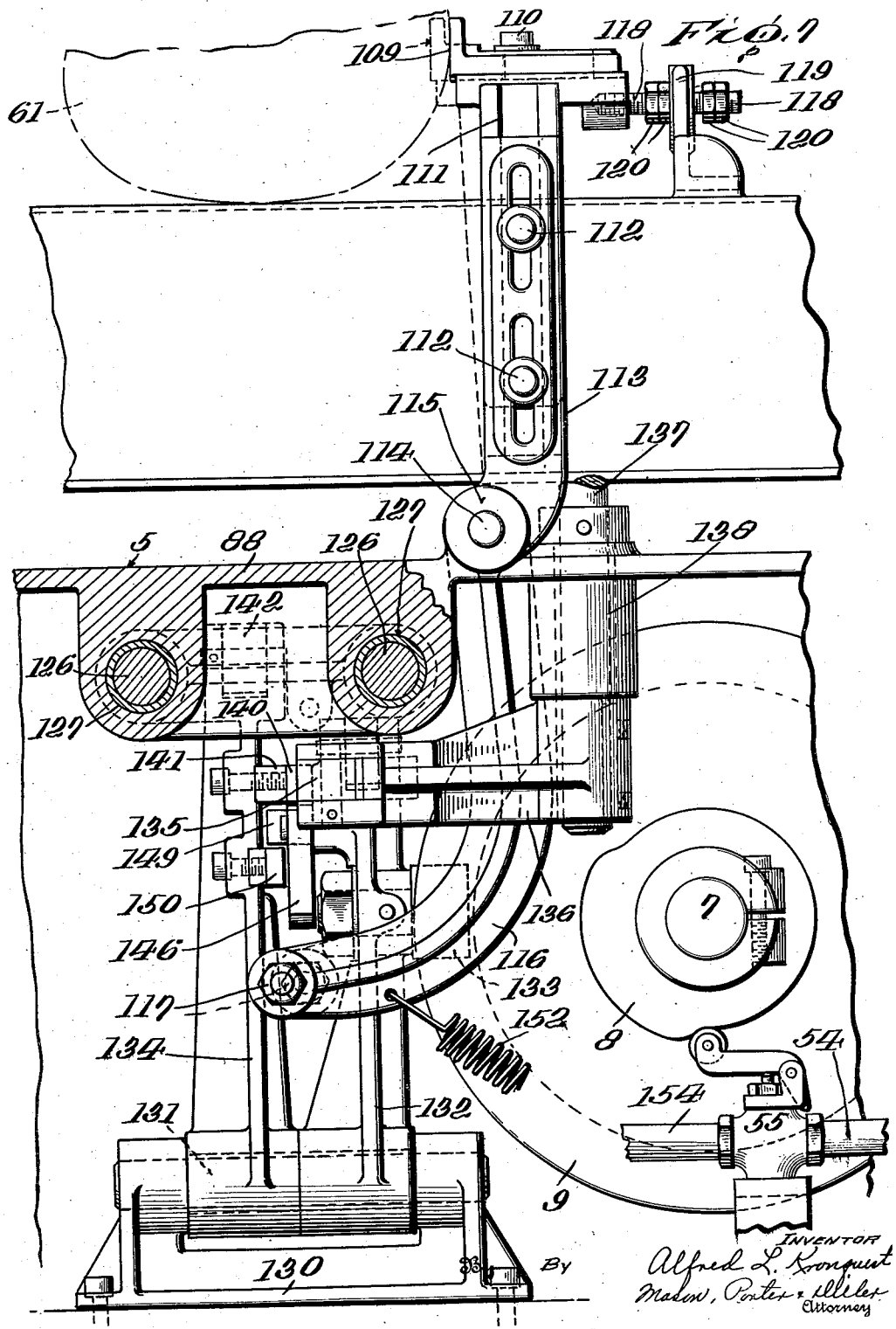

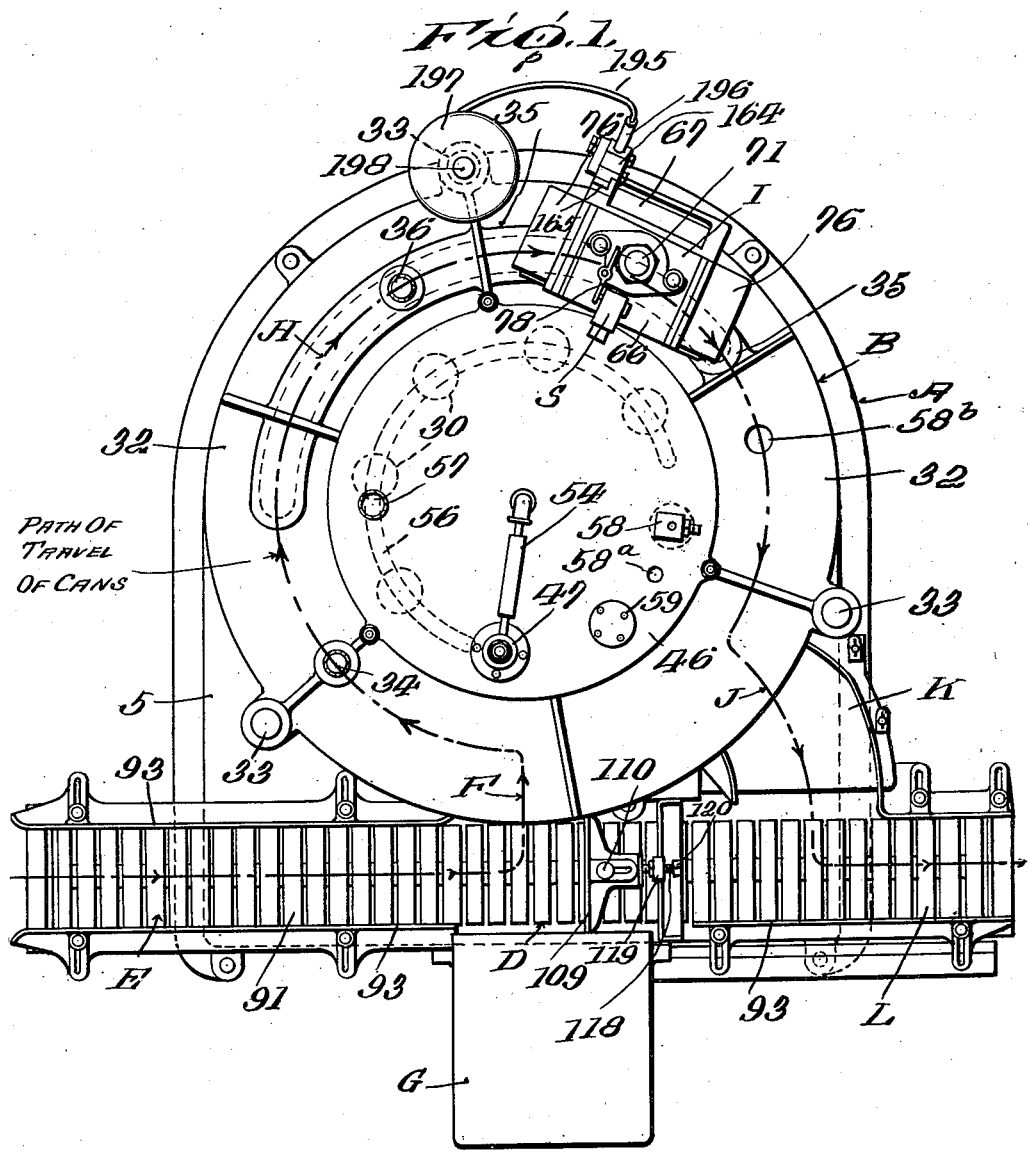

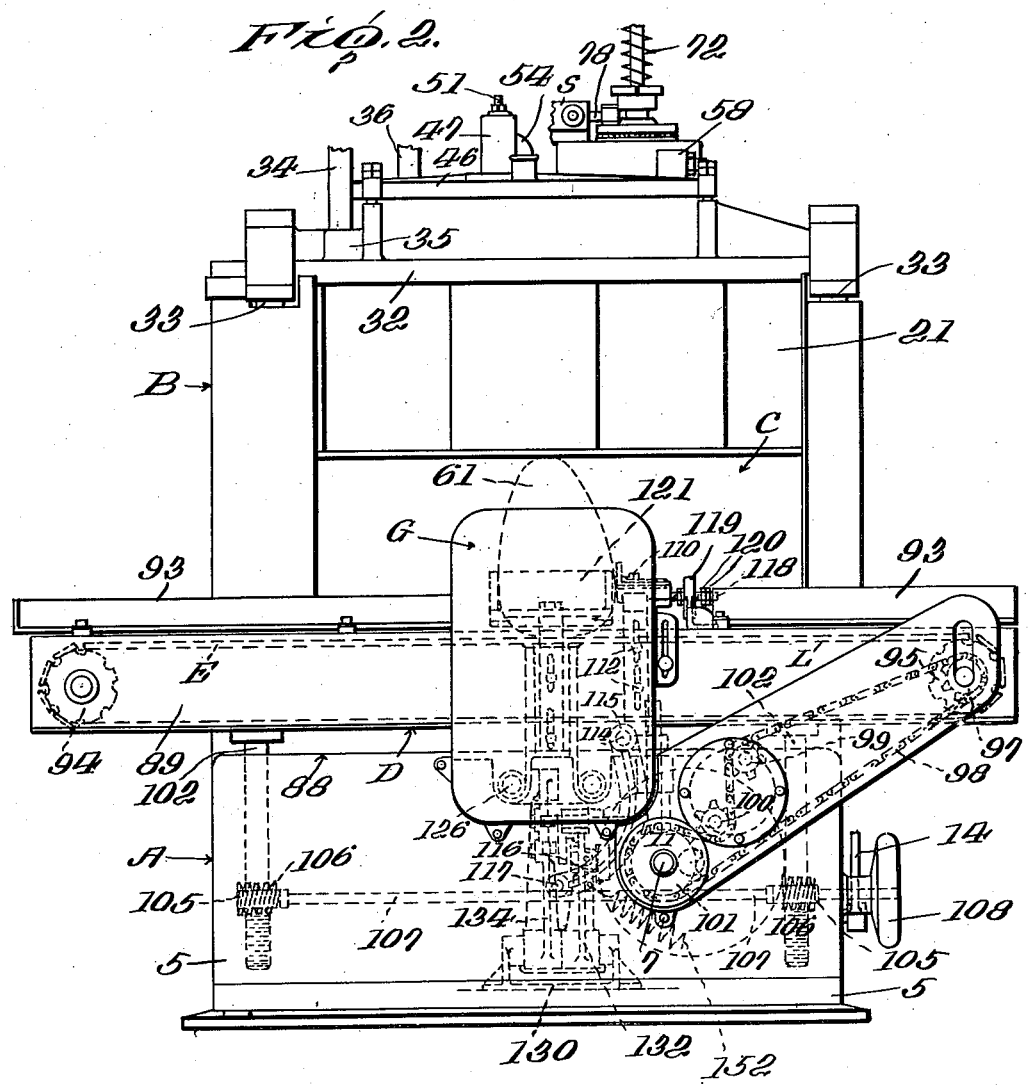

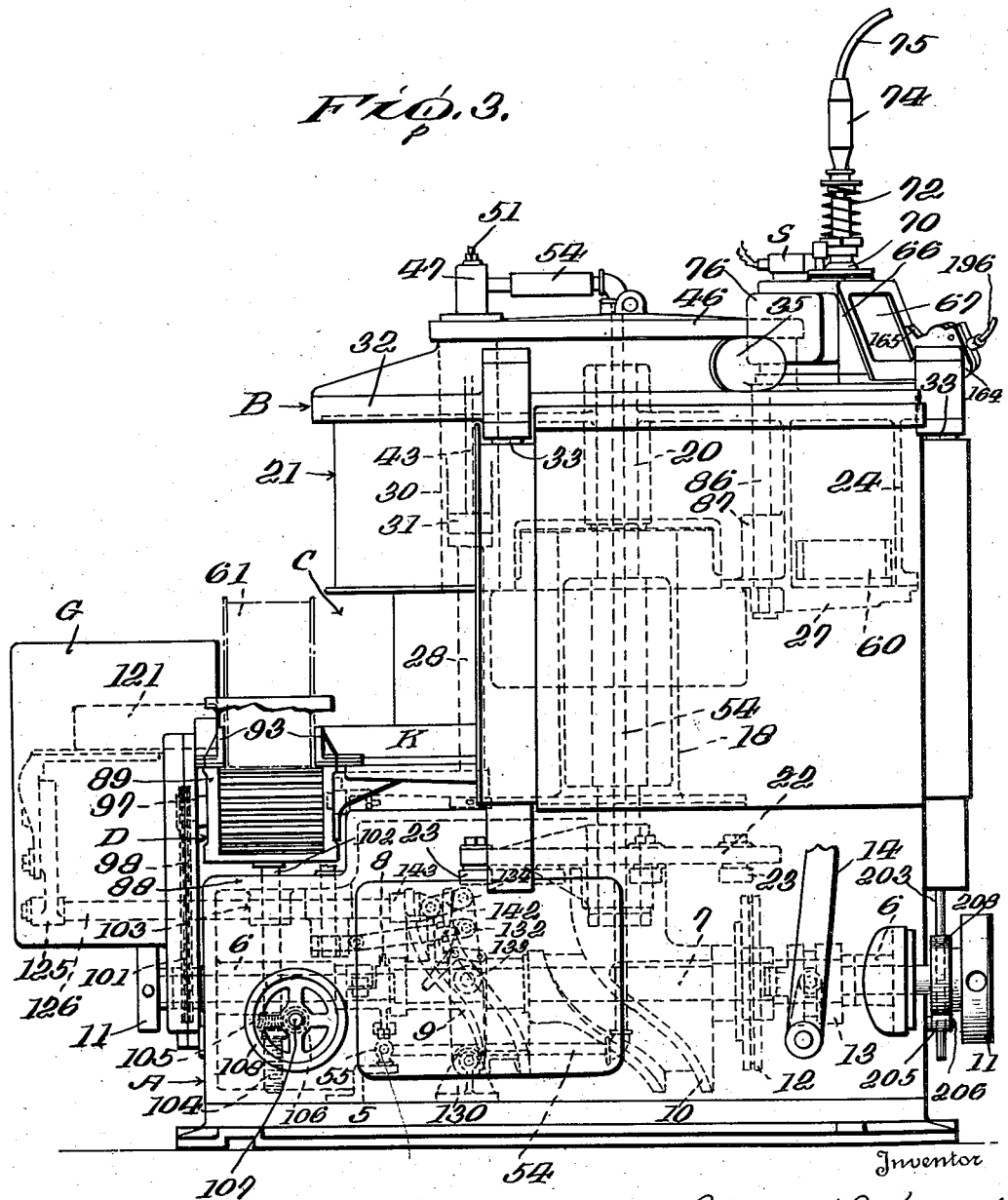

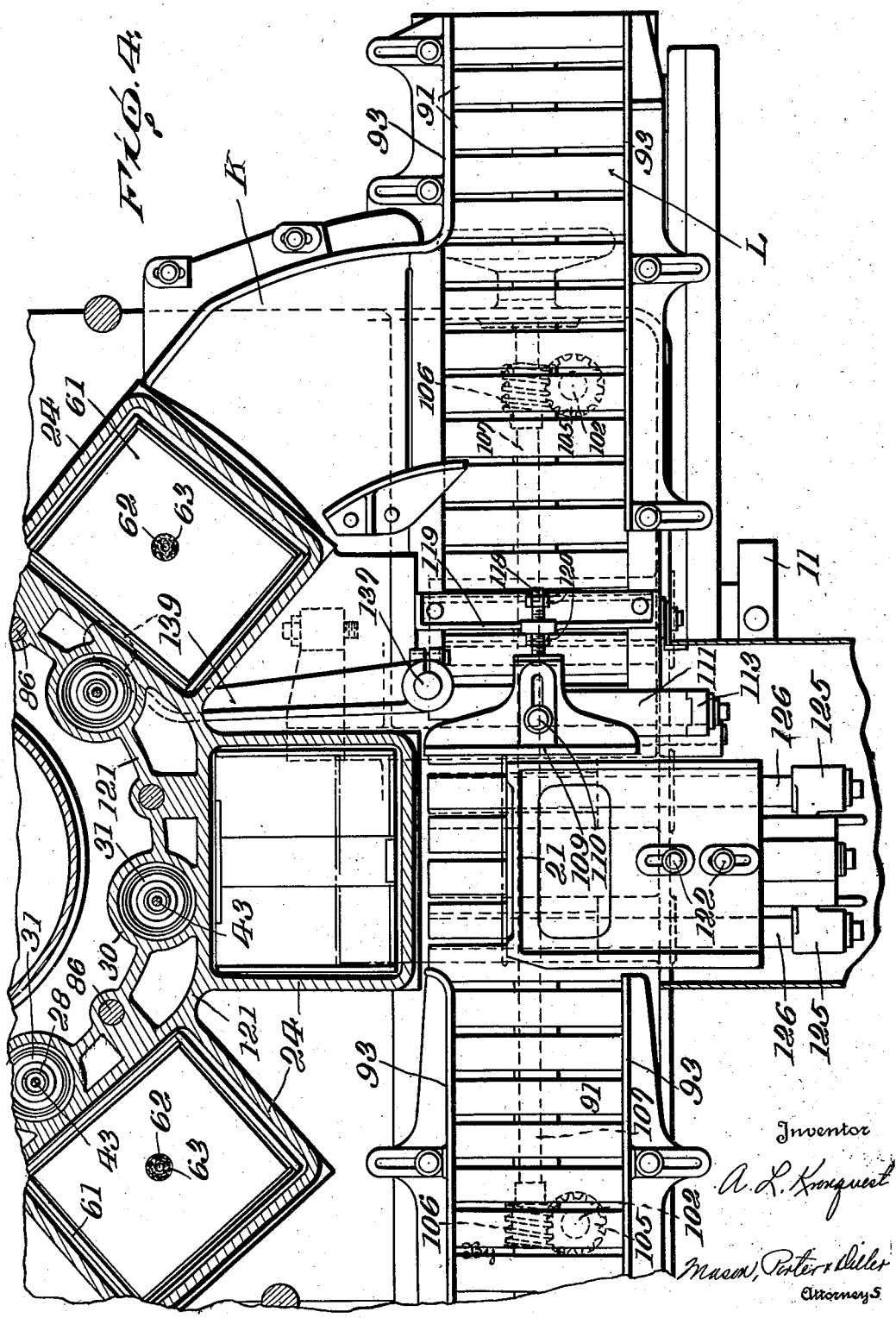

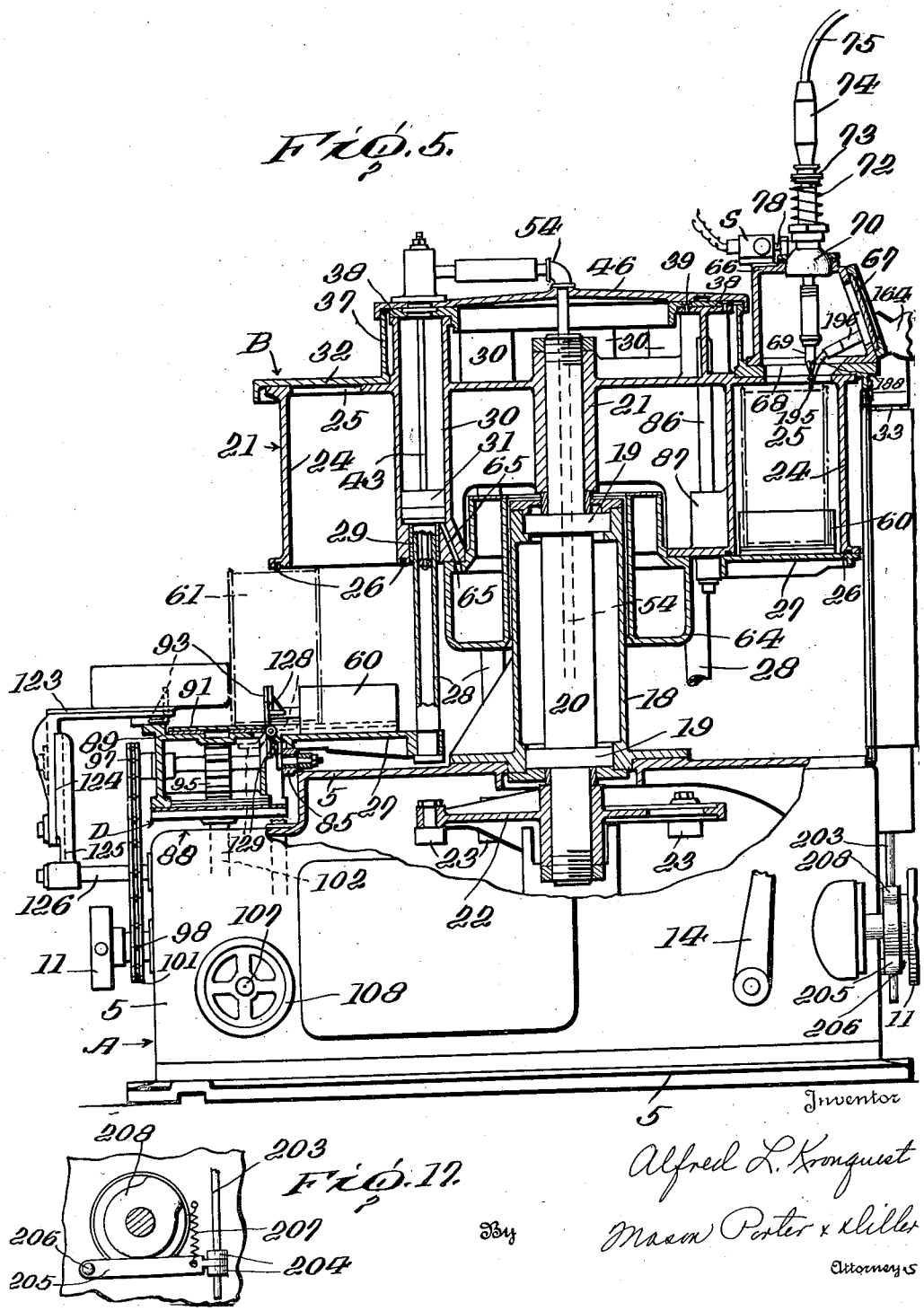

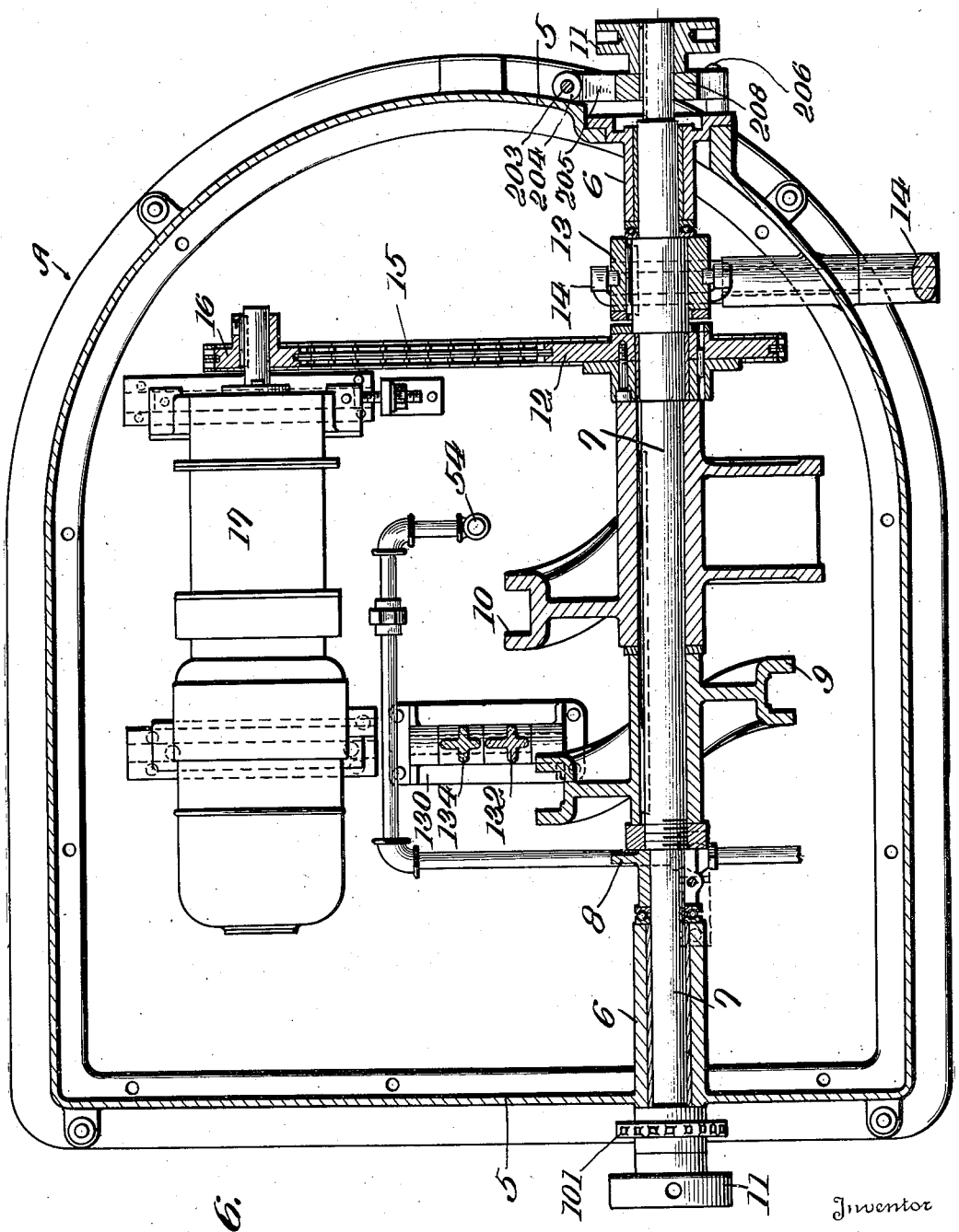

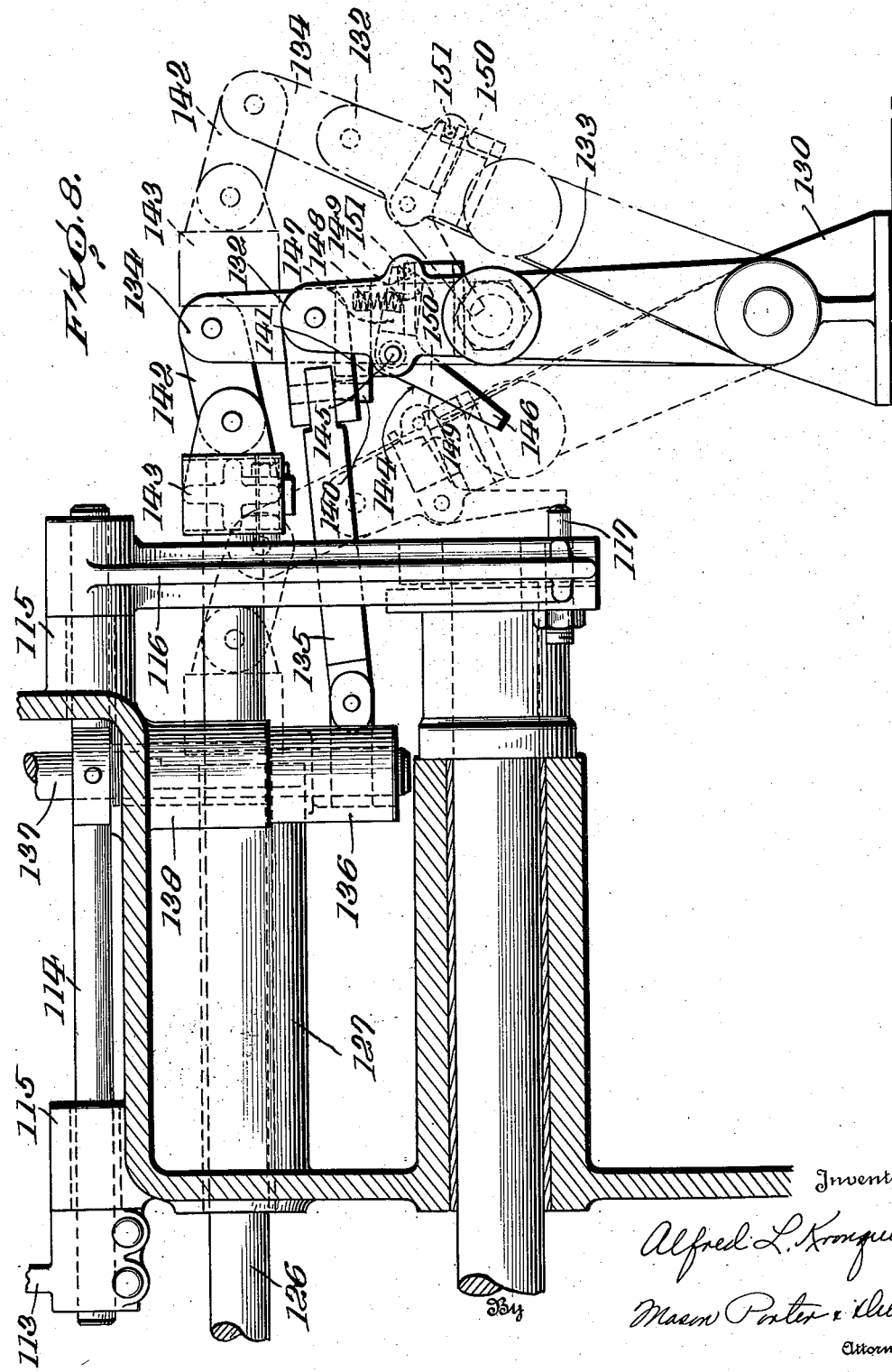

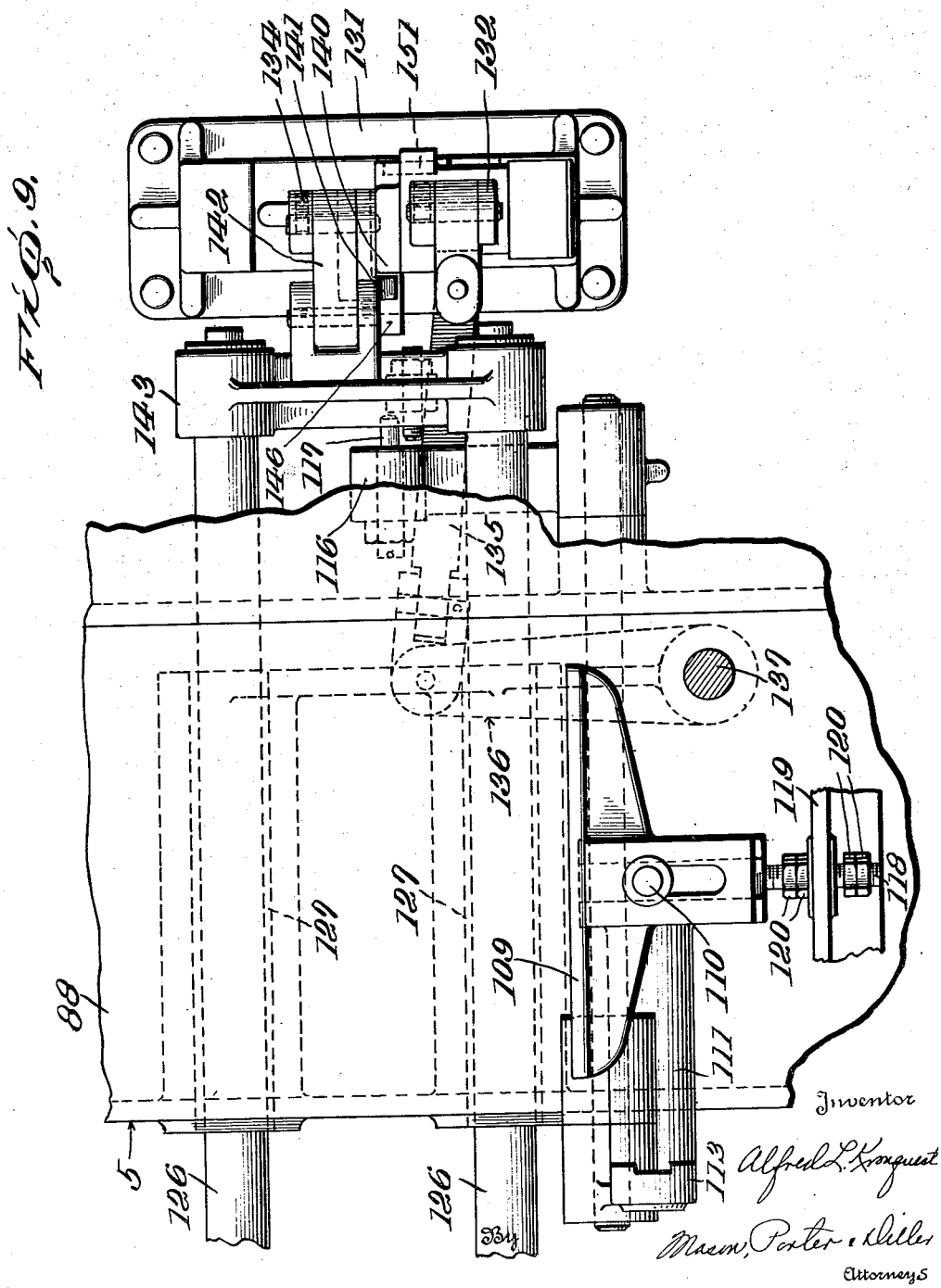

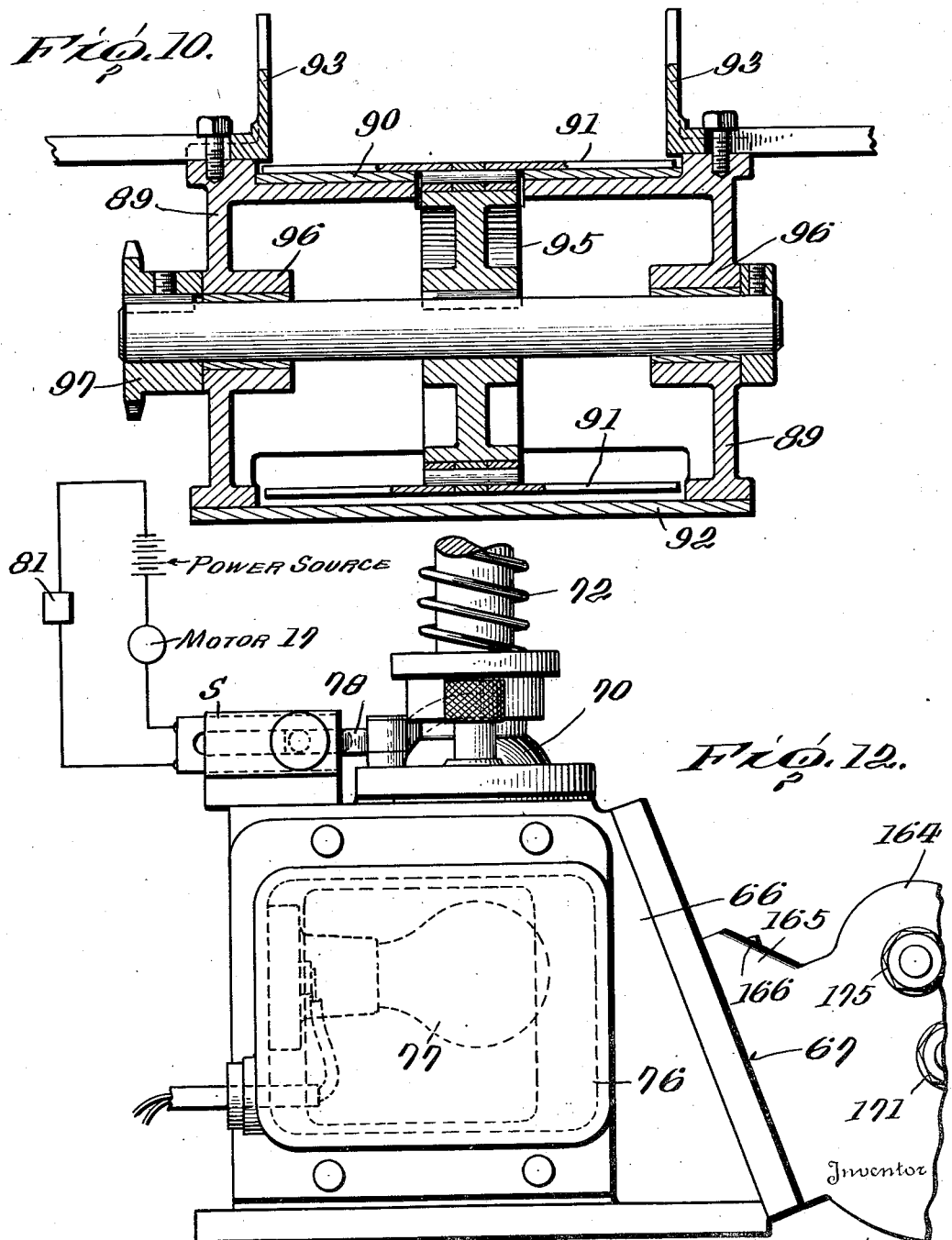

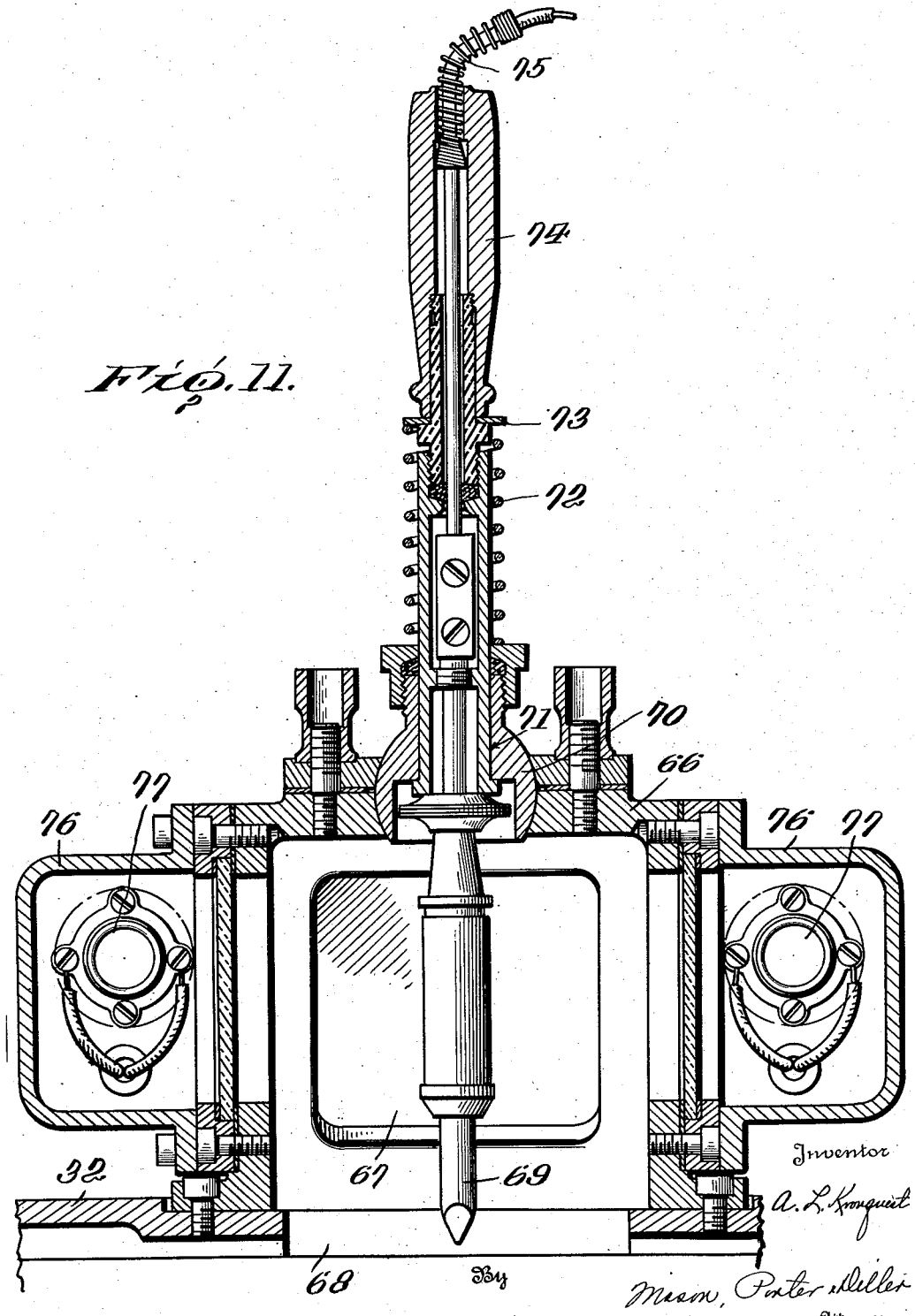

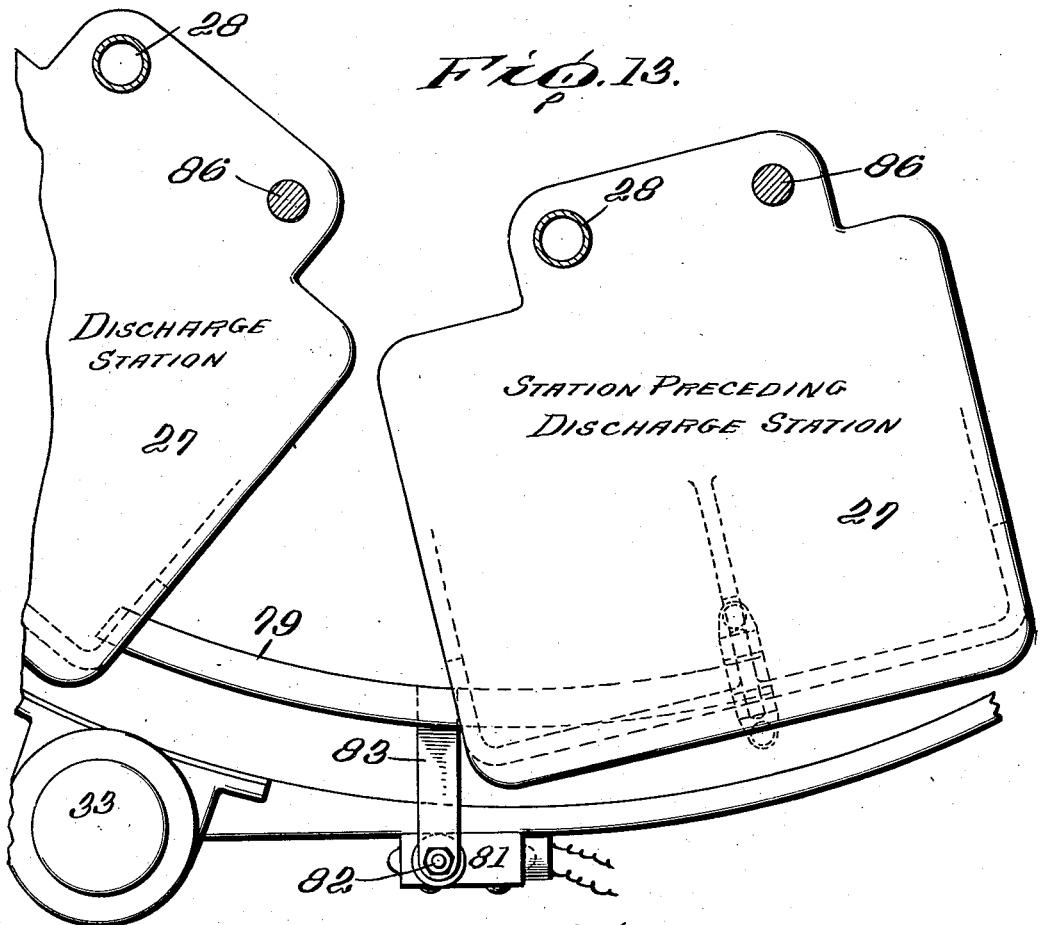

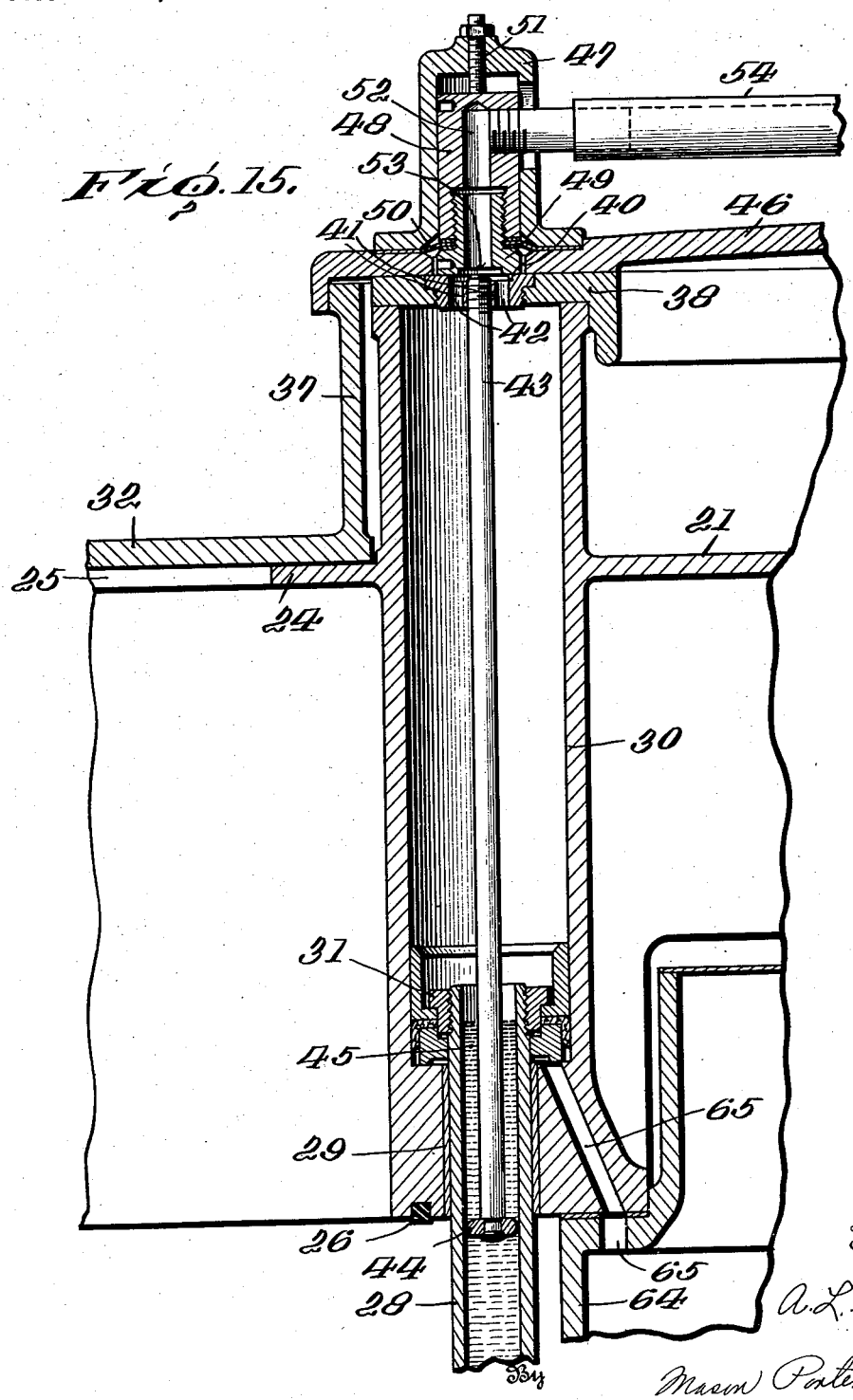

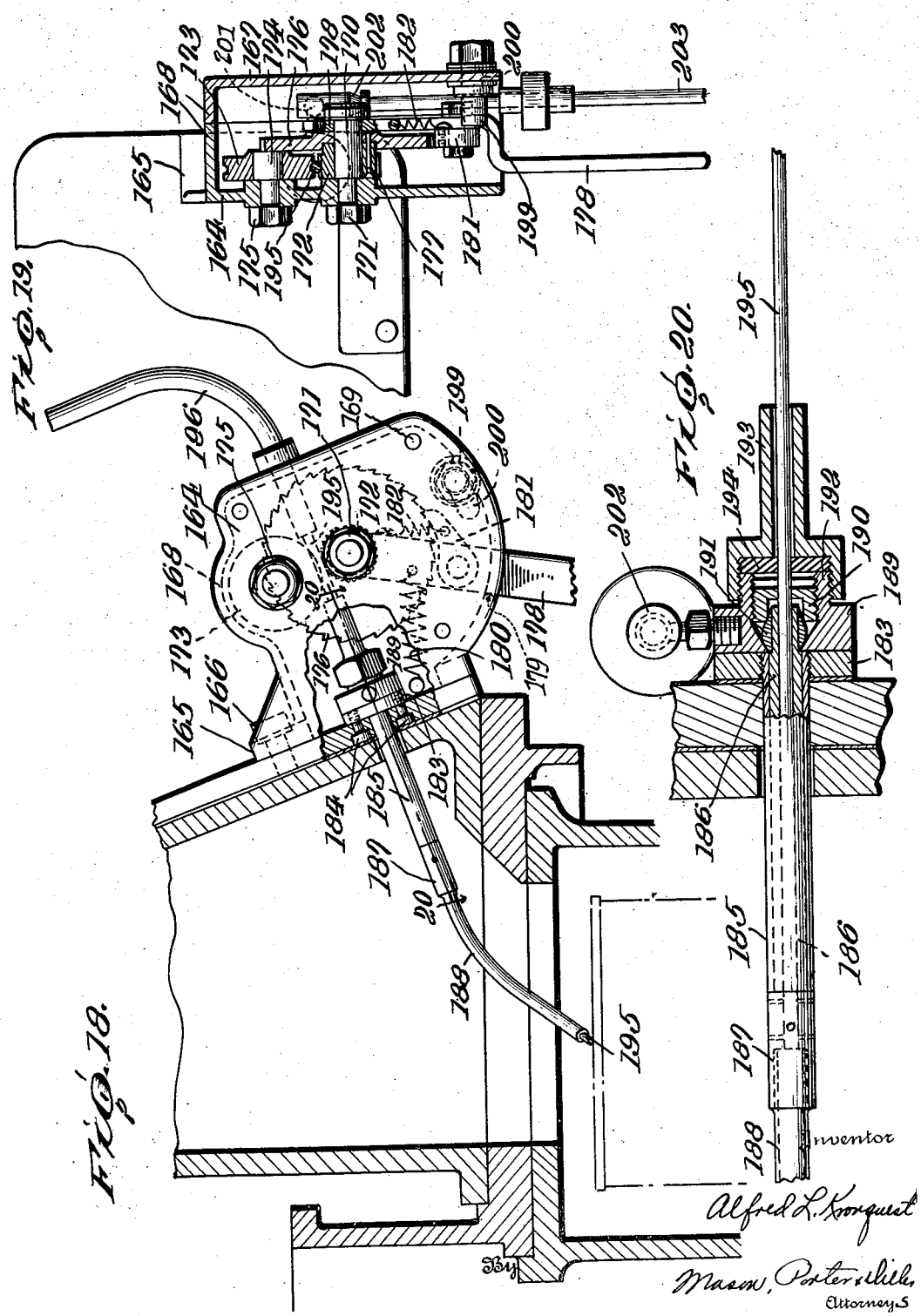

Oct. 9, 1951  A. L. KRONQUEST  2,570,956
VACUUMIZING AND CLOSING MACHINE WITH ROTARY BELL TURRET,
VERTICALLY MOVABLE, CAN SUPPORTING, BELL CLOSING PADS,
AND PAD MOVEMENT RATE CONTROL MEANS
Filed Dec. 4, 1943  16 Sheets-Sheet 15
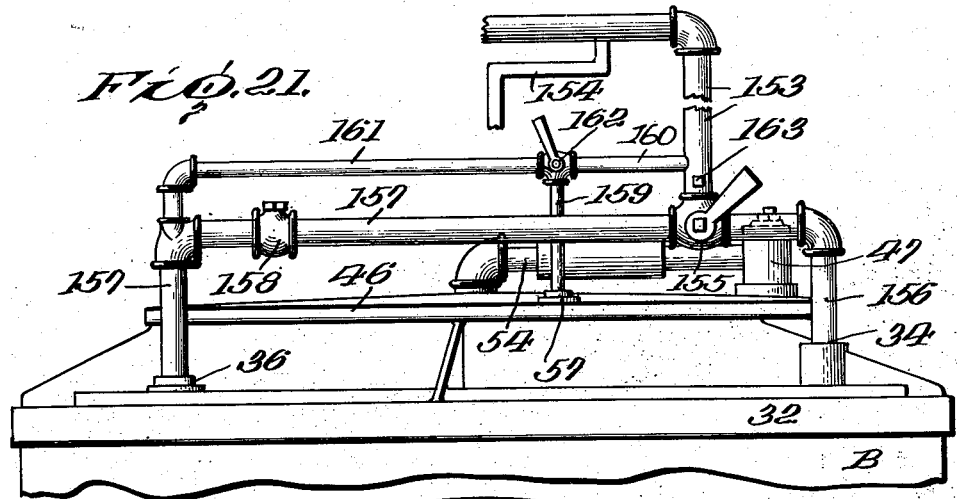
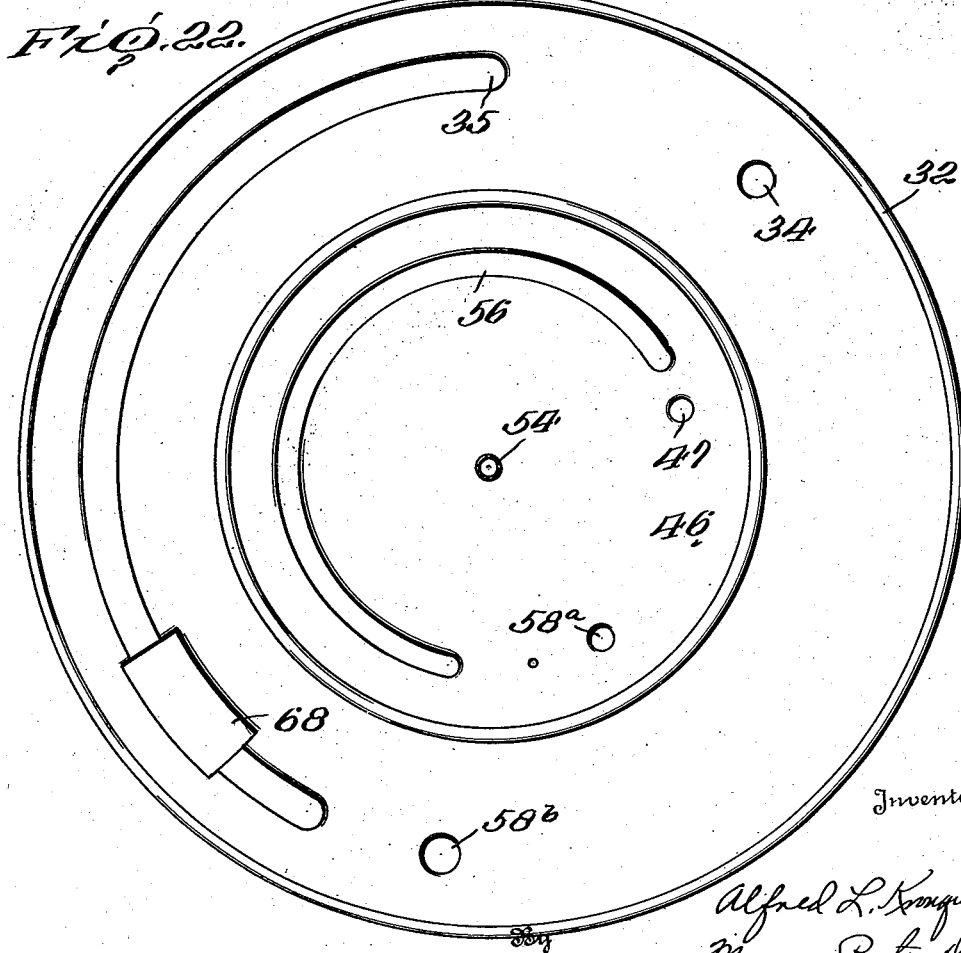
Inventor
Alfred L. Kronquest
Mason, Porter & Diller
Attorneys

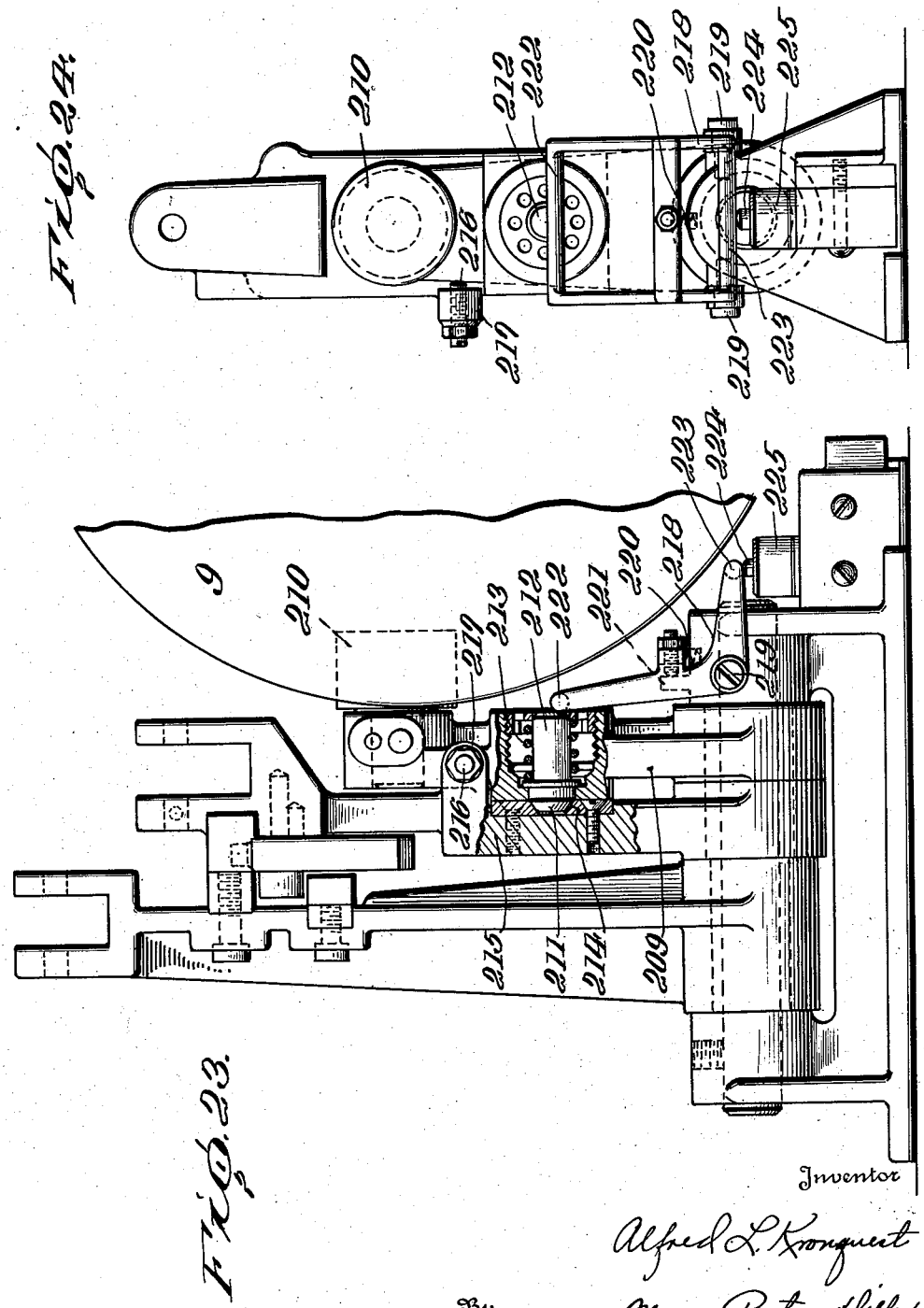

Patented Oct. 9, 1951

2,570,956

UNITED STATES PATENT OFFICE 2,570,956

VACUUMIZING AND CLOSING MACHINE WITH ROTARY BELL TURRET, VERTICALLY MOVABLE, CAN SUPPORTING, BELL CLOSING PADS, AND PAD MOVEMENT RATE CONTROL MEANS

Alfred L. Kronquest, Syracuse, N. Y., assignor to Continental Can Company, Inc., New York, N. Y., a corporation of New York Application December 4, 1943, Serial No. 512,939

32 Claims. (Cl. 226—82.2)

1

The invention relates generally to container vacuumizing and closing machines and primarily seeks to provide a novel vacuumizing and closing machine which is simple and compact in construction and capable of rapidly and efficiently vacuumizing large containers filled and closed except for a small aperture therein, hand operated means also being provided for sealing the container apertures by a simple soldering action.

In its more detailed nature the invention seeks to provide a novel vacuumizing and closing machine structure in which there is provided a turret, means for indexing the turret, a plurality of bells or vacuumizing chambers on said turret positioned to be serially presented at a filled container receiving station and a closed container discharging station, a pad for supporting a container beneath and in each chamber and dimensioned to form a sealing closure for the associated chamber, means for feeding containers onto the serially presented pads, means for lifting each pad to close the associated vacuumizing chamber, manually operable means for solder-sealing each container in the vacuumizing chamber in which it is supported, means for lowering each pad, and means for discharging closed containers from the pads as they are presented at the discharging station.

An object of the invention is to provide in a machine of the character stated novel vacuum lift means for elevating the pads to seal the vacuumizing chambers and place the containers therein.

Another object of the invention is to provide in a machine of the character stated novel means for cushioning and controlling the rate of lifting and lowering movement of the pads.

Another object of the invention is to provide in a machine of the character stated novel adaptor means for supporting the containers on the pads and filling unnecessary space within the vacuumizing chambers.

Another object of the invention is to provide a single feed-in and discharge conveyor for moving containers to and from the machine, and means for lifting or lowering said conveyor for adapting the machine for operation on different sizes of containers.

Another object of the invention is to provide in a machine of the character stated a novel infeeder pusher for placing the containers on the serially presented pads, means for reciprocating the pusher, and means for causing the pusher operation to idle whenever no container is in position to be pushed onto a pad at the receiving station.

Another object of the invention is to provide in a machine of the character stated novel means for stopping the machine in the event that any container support pad is not properly returned to its lowered position.

Another object of the invention is to provide in a machine of the character stated novel, manually operable means for solder-sealing the container apertures through which the containers are vacuumized.

Another object of the invention is to provide in a machine of the character stated novel means for stopping the machine in the event that the operator permits the solder-sealing means to remain in position for interfering with proper indexing of the turret.

Another object of the invention is to provide in a machine of the character stated separate vacuum connections, one for effecting the lifting of the pads and the other for holding the pads elevated, and cam controlled means for rendering the first mentioned vacuum connection effective only while a pad lifting means is in register at the container receiving station and in timed relation to the pushing of a container onto the respective support pad.

Another object of the invention is to provide in a machine of the character stated individual chamber evacuating means including a vacuum source and two chamber evacuating source connecting line sections one effective to initially evacuate the chambers and the other to maintain the evacuated condition in said chambers, said line sections being isolated one from the other in a manner for avoiding fluctuations in the evacuated condition in chambers which have been evacuated caused by initial evacuation of the individual chambers after they have been open to atmosphere during the discharging of closed containers therefrom and again closed.

Another object of the invention is to provide evacuating source connecting line sections of the character stated which communicate through a valve constructed to automatically close whenever the negative pressure in the initial evacuation effecting line section is less than that in the other line section effective to maintain the evacuated condition in the chambers.

Another object of the invention is to provide in a machine of the character stated novel manually operable means for feeding solder to the iron during the solder-sealing of the vacuumized containers.

Another object of the invention is to provide a solder feeding means including a shiftably mounted solder wire guiding tube and means for shifting said tube so as to displace it out of the path of travel of the turret each time the turret is indexed to present a container enclosing chamber at the soldering station.

Another object of the invention is to provide in a machine of the character stated novel means for feeding the containers onto the turret pads as they are serially presented at the receiving station and including a container pusher, a constantly reciprocated member, a pusher actuating member, and means for causing the members to move together in a direction for feeding a container onto a turret pad only when a container is in position opposite the pad presented at the receiving station.

Another object of the invention is to provide a container feeding means of the character stated in which one of said members is formed in two sections connected to move together during imposition thereon of normal loads and which are movable relatively upon imposition of overloads such as might be caused by jamming of parts during the infeeding or discharging of a container.

Another object of the invention is to provide novel means for stopping the machine whenever the two sections of the two section pusher associated member move relatively upon imposition of an overload.

With the above and other objects in view that will hereinafter appear, the nature of the invention will be more fully understood by following the detailed description, the appended claims and the several views illustrated in the accompanying drawings.

In the drawings:

Figure 1 is a plan view of a container vacuumizing and closing machine embodying the invention.

Figure 2 is a front elevation of the machine illustrated in Figure 1.

Figure 3 is a right side elevation.

Figure 4 is a fragmentary horizontal section of the machine at the container receiving station, the section being taken through the vacuumizing chamber forming bells of the turret.

Figure 5 is a vertical cross sectional view, the plane of the section being taken through the container receiving station and the solder-sealing station.

Figure 6 is a horizontal sectional view, the section being taken in the plane in which the cam shaft is located.

Figure 7 is a fragmentary vertical cross sectional view at the position of the container receiving station, the section being taken through the container pusher slide rods.

Figure 8 is a fragmentary vertical cross section illustrating the pusher and discharge arm actuating devices, the actuating levers being shown in an intermediate position in full lines, at the position for effecting the innermost projection of the pusher in dot and dash lines, and in the position for effecting the outermost position in dotted line, the latch being shown as released in the last mentioned position indicating that no container is in position on the conveyor to be pushed onto one of the turret pads.

Figure 9 is a plan view of the parts illustrated in Figure 8, the levers being shown in the position illustrated in full lines in Figure 8.

Figure 10 is a detail vertical cross sectional view of the conveyor, the section being taken in the plane in which the conveyor driving shaft is located.

Figure 11 is a detail vertical longitudinal section through the hood structure in which the soldering iron is mounted.

Figure 12 is a right end view of the structure illustrated in Figure 11.

Figure 13 is a somewhat diagrammatic fragmentary plan view illustrating two container supporting pads and the overlying segment equipment designed to effect a stoppage of the machine whenever one of the pads is not lowered to its lowermost position in which it receives a container at the container receiving station.

Figure 14 is an edge view of the parts illustrated in Figure 13.

Figure 15 is an enlarged fragmentary vertical sectional view illustrating one of the cylinder and piston equipments which control the lifting and lowering of the container supporting pads.

Figure 16 is a fragmentary sectional view illustrating the portion of one of the containers that is vacuumized and closed in the machine embodying the invention, the aperture through which the vacuumizing is effected being illustrated.

Figure 17 is a fragmentary cross sectional view illustrating the solder wire guide shifting cam.

Figure 18 is a fragmentary vertical longitudinal sectional view, and Figure 19 a similar vertical cross sectional view illustrating the solder wire feeding means.

Figure 20 is an enlarged detail horizontal section taken on the line 20—20 on Figure 18.

Figure 21 is a side elevation and Figure 22 an inverted plan view illustrating the head plate, the center plate mounted thereon, and the vacuum source and its connecting line sections.

Figure 23 is a fragmentary edge view illustrating a modified form of container pusher and discharge arm actuating lever equipment.

Figure 24 is a right side elevation of the parts shown in Figure 23.

In the example of embodiment of the invention herein disclosed the improved container vacuumizing and closing machine includes a base portion A and a superstructure or head portion B wherein is mounted the rotatable turret including a plurality of equidistantly spaced bells providing the chambers in which the containers are vacuumized and closed. The turret preferably is enclosed within a casing structure which is left open at C to permit the feeding into the machine of containers which are to be vacuumized and closed therein and also the discharging of the containers after they have been vacuumized and closed.

The containers are fed both to and from the machine on a single conveyor structure generally designated D and which includes an infeeding portion designated E and from which the containers are fed laterally into the machine as at F by a cross feed or pusher means generally designated G. After being fed into the machine, that is onto the receiving and supporting pads of the turret structure later to be described, the containers are fed around in a circular path H within the turret bells, being vacuumized in the bells while traveling, and being solder-sealed at the solder-sealing station I and then discharged as at J by a suitable discharging mechanism swingable over the discharge way K and deposited onto the feeder way portion L of the conveyor.

It will be observed by reference to Figures 3 and 6 of the drawings that the base portion A of the machine includes a metal base framing 5 having bearings 6 in which a cam shaft 7 is rotatably mounted. The cam shaft has a vacuum valve controlling cam 8 fixed thereon, and a lever oscillating cam 9 and a turret index 10 also are fixed on this shaft. The shaft 7 also has at least one socketed head 11 secured thereon exteriorly of the casing so as to permit turning over of the shaft by hand. A pulley 12 is loosely mounted on the shaft 7 and is equipped with a clutch face engageable by a clutch head 13 splined on the shaft and which may be shifted into and out of driving engagement with the pulley by a shiftable yoke lever equipment 14. The pulley 12 is driven by a belt 15 which is in turn driven by the driver pulley 16 on the shaft of the motor 17 mounted on the base.

It will be observed by reference to Figures 3 and 5 of the drawings that the base frame 5 supports a center column 18 which is provided with bearings 19 in which a turret shaft 20 is rotatably mounted in upright position. A turret structure generally designated 21 is fixed to the upper end of the shaft 20, and an indexing disk 22 is affixed to the lower end of this shaft. The disk 22 is equipped with a plurality of equidistantly spaced indexing rollers 23 which extend downwardly from the disk and correspond in number and spacing to the number and spacing of the vacuumizing chambers providing bells of the turret structure.

In this illustration the bells 24 provided on the turret structure are seven in number and are rectangular in horizontal cross section as illustrated in Figure 4. Each bell is closed at the sides and top except for the ceiling opening at 25, and said bells are wholly open at the bottom. The open bottoms of the bells are surrounded by individual gaskets 26 in the manner clearly illustrated in Figures 5 and 15.

When the vacuumizing and closing of containers is being practiced the bells 24 are closed by pads 27 which receive the containers in the manner hereinbefore stated and lift them into the bells, the pads tightly engaging the gaskets 26 and sealing the vacuumizing chambers within the bells against ingress of air.

Each container lifting and lowering pad 27 has a lifting and lowering tube 28 secured thereto and projecting upwardly therefrom, and each tube 28 is slidable in a bearing 29 provided therefor in the turret structure in the manner clearly illustrated in Figures 5 and 15. At its upper end each tube 28 extends into a cylinder 30 above the respective bearing 29 and wherein the tube is provided with a piston 31. It will be readily understood that by evacuating a cylinder 30 the piston 31 therein and the depending tube 28 and container supporting pad 27 will be lifted, and by this means the lifting of the containers into the vacuumizing chambers within the bells 24 and the sealing of said bells by contact of the supporting pads 27 with the bell gaskets 26 is effected.

The machine superstructure or head portion B includes a head plate 32 which is supported on frame standards 33 in position for being slidably contacted by the upper surface of the turret, that is the sealing portions of the bells 24 in the manner clearly illustrated in Figures 5 and 15. The head plate 32 is provided with a vacuum line connection 34 disposed to overlie the path of travel of the ceiling openings 25 into the chambers of the bells 24 as they leave the container receiving station and constitute a first vacuumizing station. The head plate also is equipped with an arcuate vacuum duct 35 overlying said path of travel and extending approximately 165° from a point spaced from the connection 34 around to and a short distance beyond the solder-sealing station I and constituting a continuing second vacuumizing connection. The duct 35 is evacuated through a separate vacuum line connection 36, and by spacing the connection 34 and the duct 35 as shown, the bell chambers are initially evacuated through the connection 34 and then finally throughout the length of the arcuate duct 35, and the duct 35 and the chambers communicating therewith are not subject to wide fluctuations in negative pressure incidental to the bringing about of sudden communication between the connection 34 and the serially presented chambers which have been open to atmosphere during the discharging of closed containers therefrom and again closed. The specific connections of the first vacuumizing station 34 and the duct 35 with the vacuum source, and the advantages thereof, will be elaborated upon hereinafter.

The plate 32 also is provided with an upstanding collar surrounding the turret cylinders 30 and into which the upper ends of said cylinders project in the manner illustrated in Figure 5. A closure ring 38 is secured as at 39 over the tops of all of the cylinders 30 as illustrated in Figures 5 and 15, and over each cylinder is provided a screw plug 40 having an internally threaded spider center 41 which provides head ports 42 and a rigid mounting for a rod 43 which depends through the respective cylinder 30 and the piston 31 therein into the respective tube 28. Within each tube 28 each rod 43 is provided with a head 44 of a diameter for providing only limited clearance between the external surface thereof and the inner walls of the tube 28. Each tube 28 contains a quantity of oil 45, and it will be apparent that the oil and the tube heads 44 cooperate in dash-pot fashion to control the rate of and to cushion the lifting and lowering of the container supporting pads 27.

Over the head plate collar 37 there is mounted a center plate 46, said plate being disposed so that its undersurface is engaged in sliding contact by the cylinder top closing ring 38.

Separate vacuum connections are utilized for effecting the lifting of the container supporting pads and the holding of said pads in their elevated positions. At a point in advance of the position of the head plate vacuum connection 34, the center plate 46 has affixed thereto a cylinder 47 in centered relation over the circular path of travel of the cylinders 30. This cylinder is so placed that it will register centrally over each cylinder 30 as it comes to rest at the container receiving station, in the manner clearly illustrated in Figures 1, 5 and 15 of the drawings. A plunger 48 is vertically slidable in the cylinder 47 and is provided at its lower end with a threadably mounted slide head 49. A diaphragm ring 50 is clamped at its inner edge between the lower end of the plunger 48 and the slide head 49, and at its outer edge between the cylinder 47 and the underlying surface of the center plate 46. An adjustable screw 51 is provided in the top of the cylinder 47 in position for limiting the freedom of movement upwardly of the plunger 48. A suction duct 52 is provided through the plunger 48 and the plug 49, an enlargement of the duct being provided as at 53 in said plug to facilitate communication with the head ports 42 in the closure ring screw plugs 40. The plunger duct 52 is connected by a pipe 54 extending down through the hollow center column in the manner clearly illustrated in Figure 3 and connecting with the suction source through a vacuum control valve 55 mounted within the base as illustrated in Figures 6 and 7, said valve being actuated by the cam 8 mounted on the cam shaft 7 in timed relation to the indexing of the turret so as to render the pad lifting vacuum effective only during a stationary interval of the turret. It will be apparent by a reference to Figure 15 of the drawings that the pressure of atmospheric air on plunger 48 and the diaphragm 50 will press the slide head 49 against the underlying screw plug 40 and assure the efficient drawing of vacuum in the respective cylinder 30 for lifting the attached pad 27 and the container thereon. At its undersurface the center plate 46 is provided with a vacuum duct 56, said duct commencing immediately beyond the position of the cylinder 47 and extending slightly beyond the terminus of the head plate duct 35, as will be evident by reference to Figure 1 of the drawings. The duct 56 is connected with a suitable vacuum source as at 57. Immediately beyond the terminus of the center plate vacuum duct 56 said plate carries an adjustable needle valve air induction fitting 58 which is equipped with a duct that admits a controlled amount of air into each cylinder as the upper end thereof comes into registry with the said induction duct for the purpose of breaking the vacuum within said cylinder and permitting the associated container supporting pad 27 to move downwardly under the additional control of the dash-pot equipment 44, 28. The center plate 46 also is provided with a full vent 58a at a point just beyond the needle valve 58 to assure that each cylinder 30 is restored to an atmospheric pressure condition and the associated pad 27 is fully lowered, and with an aperture closed by a removable cover plate 59 and disposed so that each cylinder 30 will come into registry therewith at the turret top station preceding the receiving station at which the containers are fed onto the pads 27. By removal of the plate 59 the individual cylinders 30 are rendered accessible. The plate 32 also is provided with a bleeder pipe 58b for suitably admitting air into the bell chambers.

Adaptors 60 preferably are removably mounted on the individual container supporting pads 27, the size of the adaptors being selected in accordance with the size of containers being vacuumized and closed in the machine at a given time. The adaptors also serve to fill up unnecessary space in the bells so as to reduce free space about the containers therein to the minimum.

The containers are designated 61 and each is provided with an aperture 62 through which the vacuumizing of the container can be effected, and each aperture, according to one simple adaptation of the invention, is made through a depression in the upper portion of the container in which is provided a ring of solder 63 so that by simply touching the solder ring with a soldering iron the solder sealing of the aperture can be quickly effected. See Figure 16. However, suitable solder feeding means may be provided, if desired, and a form of such means is described hereinafter.

An annular chamber 64 is attached to and moves with the turret structure, said chamber being connected through ducts 65 with the interiors of the individual cylinders 30 in the manner clearly illustrated in Figures 5 and 15. This annular chamber serves to provide for release of vacuum below the pistons 31 and will also receive any slight overflow of oil from the tubes 28.

At the solder-sealing station I is mounted a hood or chamber 66. See Figures 1, 3, 5, 11 and 12. The hood or chamber 66 is provided with an observation window 67 at its outer face, and at its bottom is equipped with an opening 68 with which the sealing opening 25 of each turret bell registers as it comes to rest at the solder-sealing station I in the manner clearly illustrated in Figure 5. A soldering iron 69 is mounted for universal movement in a ball joint 70 on the ceiling of the hood or chamber 66, said iron being telescopically mounted as at 71 in the ball joint mounting. A compression spring 72 surrounding the jaw of the iron between the ball joint and an abutment 73 on said iron handle 74 constantly tends to retract the tip of the iron to the position illustrated in Figure 5 in which the tip is clear of contact with the ceilings of the bells 24. The soldering iron may be connected with a suitable source of electric current through conductor wires 75.

The hood 66 is provided with side extensions 76 having light sources 77 therein for facilitating observation of the soldering function through the observation window 67. As each vacuumized container comes to rest at the solder-sealing station I in the manner illustrated in Figure 5, the operator, peering through the window 67, moves the soldering iron downwardly and about its universal ball mounting so as to touch the tip of the iron against the solder ring 63 and seal the container apertures 62 in the manner hereinbefore mentioned.

In order to assure against breakage on account of an operator leaving the soldering iron in the depressed position in which it might be engaged by the traveling turret and bring about a jamming of the machine, there is provided a normally closed switch S attached to the hood structure 66 in the manner illustrated in Figures 1 and 12 and which may be connected in the machine motor circuit in the manner diagrammatically illustrated in said Figure 12. A switch actuator lever 78 is pivoted intermediately of its ends on the hood structure 66 beside the ball mounting, one arm of said lever lying close to the ball mounting and the other end thereof lying against the switch plunger. It is to be understood that should an operator leave the soldering iron depressed so that it would be engaged by the turret as a bell moves away from the solder-sealing station, such contact would cause the ball mounting to engage the lever 78 and cause it to press against the switch plunger to thereby open the switch, break the motor circuit and stop the machine.

Means also is provided for stopping the machine in the event that a container supporting pad 27 is not returned to its fully lowered position, thereby making it possible to effect a jamming of the machine. A safety segment or track 79 illustrated in detail in Figures 13 and 14 is pivotally mounted as at 80 on the machine base in position for lying under and being contacted by a pad 27 at the station preceding the discharge station, and also by an edge portion of a pad positioned at said discharge station. A normally open switch 81 is mounted on the base beside the segment 79 and is normally held closed by contact of an adjustable screw 82 with the plunger thereof, said screw being mounted as at 83 on the segment 79 so as to be held depressed by contact of a container supporting pad 27 with said segment in the manner clearly illustrated in Figures 13 and 14. A compression spring 84 constantly tends to lift the segment 79, and it will be obvious that if the segment is not depressed by contact of a pad 27, the spring 84 will move the screw 82 away from the switch plunger and permit the switch to open, break the machine motor circuit and discontinue operation of the machine. As previously stated, as each container supporting pad is properly lowered it will contact the segment 79 and hold it in its depressed condition. This contact will be maintained until the pad completes its rest interval at the container discharging station, but the contact of a pad with the segment 79 will be released as the pad moves away from the discharge station. Obviously therefore, as each properly lowered pad moves away from the discharge station it will release and permit upward movement of the segment 79 if the next succeeding pad 27 has not been properly lowered so as to be in position for maintaining the depressed condition of the segment 79. Thus, whenever a pad 27 is not properly lowered, operation of the machine will be discontinued.

It will be observed by reference to Figure 5 of the drawings that one or more supporting rollers 85 may be mounted on the bed frame 5 to support and definitely place the pads 27 at the container receiving station.

It will also be observed by reference to Figures 3, 4, 5 and 13 of the drawings that each pad 27 also has a guide rod 86 secured thereto and upwardly projecting therefrom, each said rod 86 being slide-guided as at 87 on the turret.

The means by which the containers are fed into and from the machine will now be described. The machine base 5 includes a shelf portion 88 which provides a space wherein the conveyor structure generally designated D is vertically-adjustaby mounted in the manner clearly illustrated in Figures 1, 2 and 3 of the drawings.

The conveyor structure D comprises a long box-like frame 89 having a top runway or plate support for the endless slatted conveyor 91, and also a bottom plate 92. See Figures 5 and 10. Side guides 93 are laterally-adjustably mounted on the conveyor structure in the manner illustrated in Figures 1 and 10.

At one end, the slatted conveyor passes over an idler sprocket 94, and at its other end said conveyor passes over a driver sprocket 95, both said sprockets being mounted on shafts rotatable in suitable bearings 96 provided therefor in the frame 89, and the driver sprocket bearing shaft is extended beyond the frame 89 and equipped with a driver sprocket 97. Rotation is imparted to the driver sprocket 97 by a chain 98 which passes over an idler sprocket 99, a tightener sprocket 100, and about a driver sprocket 101 secured on the cam shaft 7. See Figures 2 and 3.

Support columns 102 are secured to and depend from the conveyor casing structure 89, and these columns are vertically-slidably mounted on the frame 5 in bearings 103. The lower end of each column 102 is externally threaded as at 104 and passes through a captive screw sleeve worm gear 105 which is engaged by a worm gear 106. Both worm gears 106 are secured on a horizontally disposed shaft 107 mounted within the base 5 and having one end thereof extending beyond the base and equipped with a hand wheel as illustrated in Figures 2, 3 and 4. It will be obvious that by rotating the hand wheel 108 the whole conveyor frame 98 can be lifted or lowered to present the top surface of the slatted conveyor 91 at the proper elevation with respect to the container supporting pads and according to the particular size of container to be vacuumized and closed in the machine.

As each container being fed along on the infeeding portion E of the slatted conveyor 91 reaches the receiving station whereat it is to be laterally shifted from the conveyor 91 and deposited on the supporting pad at rest at said station, it strikes a stop 109 which extends across the conveyor 91 in the manner clearly illustrated in Figures 1 and 4. The stop 109 is horizontally-longitudinally adjustable as at 110 on a standard piece 111 which is vertically-adjustably mounted as at 112 on the upper end of a lever 113. See Figures 3, 5 and 7. The lever 113 is secured to one end of a rock shaft 114 which is rockably mounted in bearings 115 on the frame shelf 88. See Figures 7 and 8. A lever 116 is secured to the other end of the shaft 114 and depends therefrom and is equipped at its lower end with a laterally projected trip pin 117. The upper end of the lever piece 111 which carries the stop 109 has a rod 118 projecting therefrom through an aperture in a bracket 119 secured across the conveyor frame 89 in the manner illustrated in Figures 1, 4 and 7. Abutment members 120 are adjustably mounted on the rod 118 at opposite sides of the bracket 119 and serve to limit the amount of movement of the stop, the lever equipment 113, 116 and the trip pin 117 by reason of the contact of an infeeding container 61 with the stop 109.

The cross feed equipment hereinbefore generally designated G and which serves to feed the containers laterally as at F in Figure 1, after they have been stopped on the conveyor 91 by the stop 109 and effectively positioned the trip pin 117, includes a pusher head 121 disposed opposite the container receiving station as shown in Figures 2, 3 and 4. The pusher head 121 is adjustably secured at 122 on a pusher member 123 which is vertically-adjustably secured as at 124 on a cross head 125. The cross head is attached to slide rods 126 which are horizontally slidable in bearings 127 provided therefor on the base frame 5. See Figures 5, 7 and 9. It will be obvious that as the rods 126 are moved to the right as viewed in Figures 5 and 9 the pusher head 121 will be moved to displace a container from the slatted conveyor 91 and feed the same laterally onto the particular container supporting pad 27 which is at the same time stationary at the receiving station.

In order to facilitate the feeding of the containers onto the pads 27 and assure against any bouncing back of the containers which would make them project from the supporting pads and possibly cause a jamming of the machine, there is provided a safety gate 128 which is pivotally mounted on the conveyor frame 89 and which includes a depending end portion 129 which is acted upon by gravity to normally place the gate 128 in upright position. As each container is fed laterally off the slatted conveyor 91 and onto the receiving pad 27 it displaces the gate 128 downwardly and moves thereover, the gate in its horizontal position serving to bridge the gap between the conveyor structure 89 and the floor on the pad 27. As soon as the container passes over the gate 128 said gate will swing upwardly and act as a back check to prevent bouncing of the can or any portion thereof back toward the conveyor a distance which might cause jamming when the can is lifted up into the socket in the turret.

A bracket 130 is mounted on the floor of the base in the position illustrated in Figures 2, 6, 7, 8, and 9. In the bracket 130 is mounted a fulcrum shaft 131 on which is swingably mounted a lever 132 which is continuously oscillated by reasons of being equipped with a laterally directed roller engaged in the groove in the lever oscillating cam 9, and a second lever 134 which moves with the lever 132 only when latched thereto by means which will be described hereinafter. The lever 132 is link connected as at 135 with a crank 136 secured on the lower end of a rock shaft 137 rockably mounted in the base frame bearing 138. See Figures 4, 8 and 9. At its upper end the shaft 137 has a discharge arm 139 affixed thereto in the position clearly illustrated in Figure 4. The effective end of the discharge arm 139 normally lies in the position illustrated in Figure 4 just outside the circle in which the pad tubes 28 and guide rods 86 are positioned and between said tubes and rods and the container supported on a given lowered pad 27 so that when the arm 139 is swung outwardly, or to the right and downwardly as viewed in Figure 4, it will serve to discharge the vacuumized and sealed container 61 from the respective pad 27 and feed it over the discharge feedway K and onto the feedway portion L of the conveyor 91.

It will be observed by reference to Figures 7, 8 and 9 of the drawings that the continuously oscillating lever 132 is provided with a return shoulder 140 which is engageable with a return lug 141 projecting from the lever 134 for returning the lever 134 to its initial position after each movement thereof with the lever 132, thereby serving to return the pusher head 121 to normal after each movement thereof effective to place a container on a supporting pad 27. For this purpose the lever 134 is link connected at 142 to a cross head 143 attached to the slide rods 126 which carry the pusher head in the manner hereinbefore described.

A latch 144 is pivoted at 145 on the lever 132 and has a downwardly extended tail 146 which normally moves with the lever 132 in the same vertical plane in which the trip finger 117 normally lies so that the latch will be tripped each time it moves to its forward position as illustrated in dotted lines in Figure 8. This condition of the parts pertains when no container 61 is being fed against the stop 109. Whenever a container is fed against the stop and displaces it in the manner illustrated in Figure 7, the trip pin 117 will be moved out of the path of travel of the latch tail 146 and will not be engaged by said tail for the purpose of tripping the latch.

The latch 144 includes a body portion 147 which is normally held depressed in the position illustrated in full lines in Figure 8 by a compression spring 148 so as to cause the latch shoulder 149 to engage behind the latch block 150 which projects from the lever 134 in the manner clearly illustrated in Figure 7, downward movement of said latch body being limited by the stop pin 151.

The trip pin positioned lever 116 is normally held by the anchored spring 152 in the dotted line position illustrated in Figure 7, this being the position in which the trip pin 117 will intercept and trip the latch 146, 149. Whenever no container 61 is in position on the conveyor to be shifted onto a receiving and supporting pad 27 the trip pin 117 will trip the latch tail 146 and lift the latch shoulder 149 so that on the movement of the constantly oscillating lever 132 toward the right as viewed in Figure 8 the latch block 150 projecting from the lever 134 will not be contacted by said shoulder 149 and the lever 134 will not be caused to move to the right with said lever 132. Whenever a container 61 shifts the trip pin 117 to the full line position as illustrated in Figure 7, however, the latch tail will not engage said pin 117 and the latch shoulder will then engage over the latch block 150 projecting from the lever 134 and will cause the lever 134 to move to the right with the lever 132 and thereby actuate the pusher head 121 so that it will feed the container onto the pad 27 at the receiving station.

The specific connections of the first vacuumizing station 34 and the duct 35 will now be described, reference being had to Figures 21 and 22. In Figure 21 the single vacuum source is somewhat diagrammatically indicated at 153, and this source is connected by a duct or pipe 154 with the previously described cam controlled valve 55 shown in Figures 3 and 7. The vacuum source 153 also connects through a shut off valve 155 and individual branch lines 156 and 157 with the previously mentioned first vacuumizing station connection 34 and with the connection 36 serving the second phase vacuumizing duct 35, a check valve 158 being provided in the line 157 serving the duct 35 and effective to isolate the lines 156 and 157 one from the other in a manner for avoiding fluctuations in turret chambers which have been evacuated which fluctuations would otherwise be caused by communication between said chambers and a chamber being initially evacuated. It will be obvious that prior to initial evacuation at the station connection 34 each chamber will be at atmospheric pressure, having been open during the preceding closed container discharge, and during the initial evacuation there is wide fluctuation in the negative pressure in the part of the system connected at the station 34. In order to avoid like fluctuation in the portion of the system connected with the duct 35 at 36 the valve 158 closes whenever negative pressure in the line 156 is less than that in the line 157 connected at 36. Therefore, each time the system is subjected to a drop in negative pressure due to a container and turret chamber at atmospheric pressure being brought into registration with the initial vacuumizing station 34, the valve 158 closes and maintains a constant negative pressure in the turret pockets and containers therein which are in communication with the arcuate duct 35.

As has been explained hereinbefore, the container supporting and chamber closing pads 27 are initially raised by vacuum through the connection 47 and line 54, 154 under control of the cam actuated valve 55, and the vacuum in the arcuate duct 56 separated slightly from the connection 47 and connected in the system at 57 maintains said pads in their raised positions. Vacuum for holding the pads 27 elevated is supplied through the line 159 either from a connection 160 with the vacuum source line 153 or from a connection 161 with the branch line 157, a three-port, two-way valve 162 being provided to permit the operator to select which line 160 or 161 shall be effective.

With a given pump capacity there is more fluctuation in negative pressure in branch line 156 and line 153 when a high vacuum is being drawn than when a low vacuum is being drawn. A regulator valve somewhat diagrammatically indicated at 163 is installed in the line 153 in a low vacuum hook-up. Therefore, when the system is operating on high vacuum, the pad holding duct 56 is connected through lines 159 and 161 with the branch line 157, which is the side of the system subject to the least fluctuation. When operating on low vacuum, the duct 56 is connected through lines 159 and 160 into the source line 153 ahead of the regulator valve 163.

In the operation of the machine, assuming that containers are fed one at a time onto the pads 27 as they come to rest at the receiving station in the manner hereinbefore described, each such pad will be lifted by evacuation of the respective cylinder 30 under the timing control of the rotary cam 8 in the manner hereinbefore described. The lifting of each pad will be cushioned and the rate of lift controlled by the dash-pot action of the rod head 44 in the oil in the respective tube 28. As before described, the pads not only lift the containers into the bells 24 but they also serve to seal the bottoms of the bells. As the turret is indexed each bell communicates through its ceiling opening 25 with the vacuum duct 35 and a vacuum is drawn in the vacuumizing chamber in the bell and in the container therein. As before described, the vacuum is drawn in two stages, the first stage or initial evacuation being accomplished by communication of the sealed bells 24 individually with the vacuum connection 34, and the second stage evacuation being accomplished by communication of the bells 24 with the arcuate duct 35 which extends to and slightly beyond the solder-sealing station I and is spaced from the connection 34 and isolated by the valve 158 so as not to be subject to the wide fluctuations in negative pressure occurring at the connection 34 incidental to the intermittent initial drawing of vacuum in the bells at said connection or station 34. As each cylinder 30 moves away from the receiving station its head ports 42 communicate with the arcuate vacuum duct 56 in the center plate 46 and the cylinder pistons 31 are acted upon to firmly hold the pads 27 in the elevated, vacuumizing chamber sealing position.

At the solder-sealing station I the operator, peering through the observation window 67, manipulates the soldering iron so as to touch the hot tip thereof against the ring of solder 63 surrounding the aperture 62 through which the container has been vacuumized and thereby solder-seals said aperture. If desired, solder feeding means may be provided for placing an end of solder wire in position for cooperating with the soldering iron in solder-sealing the aperture 62, in which case the solder rings 63 can be dispensed with. A novel manually operable solder wire feeding means is described hereinafter.

As before described, should the operator leave the soldering iron projecting down into the turret so that indexing of the turret would impart lateral movement to the iron, such movement will swing the safety lever 78 about its center and cause it to engage and open the normally closed switch S and by this means break the motor circuit and discontinue operation of the machine.

As each bell is indexed beyond the solder sealing station I the ceiling opening 25 thereof moves out of registry with the vacuum duct 35 which terminates just beyond said station as indicated in Figure 1. Just beyond the terminus of the vacuum duct 35 the head ports in the respective turret cylinders 30 will move out of registry with the vacuum duct 56 and into registry with the vacuum relieving, atmospheric air admitting valve 58 which will admit air into the cylinders and permit the pistons 31 and the attached container supporting pads 27 to move downwardly under the control of the dash-pot equipments 28, 44. Restoration of atmospheric pressure in the cylinders 30 and bells 24 following completion of the vacuumizing and closing of the containers is assured by the air vents 58a and 58b formed respectively in the center plate 46 and head plate 32 as illustrated in Figure 1.

After each pad 27 is completely lowered and presented at the discharge station, the discharging arm 139 will be swung outwardly and downwardly as viewed in Figure 4 to remove the vacuumized and closed container from the pad 27 and deliver it over the feedway K onto the feedway portion L of the slatted conveyor 91 as hereinbefore described. Should any container supporting pad 27 fail to be completely lowered to its proper container discharging position it will fail to depress the safety segment 79 shown in Figures 13 and 14 and permit the spring 84 to lift said segment and allow the switch 81 which is normally held closed by depression of the segment to open, break the motor circuit and discontinue operation of the machine.

If desired, any suitable solder feeding means may be employed instead of utilizing the solder rings 63 and one satisfactory and novel form of such means is illustrated in Figures 18 and 19. Said means includes a housing plate 164 having an integral mounting flange 165 adapted to be secured as at 166 to the solder station housing as shown in Figures 1, 5, 18 and 19. An opposing cover plate 167 is provided, and the plates 164 and 167 have meeting flanges 168 and are secured together as at 169.

A shouldered stud screw 170 is secured as at 171 to the plate 164 and forms a journal for the solder feed wheel 172. The feed wheel 172 is opposed by a grooved wheel 173 which is freely rotatable on a stud 174 secured as at 175 to the plate 164.

A large ratchet wheel 176 is secured as at 177 to the feed wheel 172 about the center stud 170, and said stud also serves as a fulcrum for a lever 178 which extends downwardly through the open bottom of the casing and is normally held against the casing flange stop 179 by an anchored spring 180 in the manner clearly illustrated in Figure 18. The lever has a pawl 181 pivoted thereon, and the pawl is yieldably held against the ratchet wheel 176 by a spring 182 attached to the pawl and to the lever 178.

A collar 183 is secured as at 184 to the solder housing plate in the manner clearly illustrated in Figure 18, and the collar has a long sleeve bearing 185 attached thereto in position for extending through the solder housing plate into the interior of the housing. A hollow guide sleeve 186 is rockably mounted in the sleeve bearing 185 and is equipped with an enlargement 187 in position for abutting the innermost end of said bearing and a curved guide extension 188 which extends into position for guiding the fed solder wire into position for cooperating with the soldering iron 69 during the solder sealing of the individual container apertures 62. It will be obvious that by rocking the guide sleeve 186 about its axis the curved end extension 188 of the guide tube may be displaced from its effective position illustrated in Figure 18 in which it extends down through one of the ceiling openings 25 in the turret structure 21 to an ineffective position in which the end extremity of the extension 188 is elevated above the ceiling openings 25 so as not to interfere with proper indexing of the turret structure.

In order to provide for the proper movement of the guide sleeve extension 188 between effective and ineffective positions as above stated, there is provided a rocking head 189 which surrounds the end of the sleeve 186 and is chambered to threadably receive a clamp sleeve 190 which cooperates with the inner end extremity of the head in the manner clearly illustrated in Figure 20 to clamp the enclosed nipple 191 on the reduced end extremity of the sleeve 186 within the head chamber. The head 189 is provided with an externally threaded extension 192 and a guide chamber 193 is threadably mounted thereon. It will be observed by reference to Figure 20 that a rubber packing ring 194 is clamped between the members 192 and 193 and against the solder wire 195 in a manner for providing a vacuum seal.

The solder wire 195 is fed into the casing through a guide 196 provided on the casing, said wire being supplied from a spool 197 which may be mounted as at 198 on the machine super structure B. The wire passes through the guide 196, between the feed wheels 172, 173, and through the guide devices 193, 186 and 188 in the manner clearly illustrated in Figure 18.

A stop pin 199 is adjustably mounted as at 200 in the cover plate 167 and cooperates with the flange stop 179 in limiting the amount of movement that can be manually imparted to the solder feeding lever 178, thereby to control the length of solder wire to be fed during each active movement of the feed lever 178, as from the full line position in Figure 18 to the right into contact with said pin 199.

In order to assure displacement of the guide extension 188 from its effective position illustrated in Figure 18 to an ineffective position above the turret ceiling opening 25 each time the turret structure is indexed, means are provided for automatically displacing said guide extension during each indexing and again replacing it in effective position after the indexing movement of the turret has terminated. This means includes a crank ball 201 secured to and extending laterally from the rocking head 189 and which is connected as at 202 to the upper end of an actuator rod 203. The rod 203 is connected as at 204 at its lower end to a lever 205 which is pivoted as at 206 on the base frame and is spring held as at 207 against an actuator cam 208 mounted on the cam shaft 7. See Figures 5, 17, 19 and 20.

As an added safety means, provision may be made for stopping the machine in the event that a jam should occur during the infeeding of a container onto a turret pad, or the discharging of a container from a pad after the container is vacuumized and closed. This additional safety means is illustrated in detail in Figures 23 and 24. In this modified equipment the continuously oscillated lever such as is designated 132 in Figure 7 may be formed in two relatively movable parts, the part 209 being continuously oscillated by engagement of the actuator roller 210 carried thereby in the groove of the cam 9. The lever piece 209 carries a detent 211 formed on the end of a slidably mounted plunger 212, said plunger being spring pressed as at 213 to normally project the detent beyond the face of the lever piece in the manner illustrated in Figure 23 for projecting into the receiving socket 214 provided on the other lever piece 215 which is to be connected with the container discharging arm, and which when properly latch-connected serves to move the pusher which feeds the containers onto the turret pads. The lever piece 215 is provided with a screw 216 adjustably mounted in an overhanging lug 217 and projects into the path of travel of the lever piece 209 in the manner illustrated in Figures 23 and 24 so as to cause the lever piece 215 to positively move with the lever piece 209 in the direction for retracting the container pusher and the container discharging arm. It will be obvious that the lever piece 215 will move in the opposite direction with the lever piece 209 under all normal load conditions, but in the event that a jam should occur during the infeeding of a container or the discharging of a container, the detent 211 would ride out of the socket 214 on the lever piece 215 and permit movement of the driven lever piece 209 relative to the jammed lever piece 215 without breakage of machine parts.

In order to stop the operation of the machine whenever a jam occurs which would cause the lever pieces 209 and 215 to move relatively in the manner above described, there is provided a rocker bell crank 218 which is pivoted as at 219 on the lever supporting bracket and is constantly urged by a compression spring 220 against the positioning stop 221. The positioning stop places one leg 222 of the lever 218 opposite the outer end of the plunger 212 so as to be displaced by the plunger whenever the detent 211 is displaced from its receiving socket 214 as a result of a jam as hereinabove described. The other end 223 of the bell crank 218 overlies the plunger 224 of a normally closed control switch 225 connected in the machine motor circuit, and it will be obvious that whenever the plunger 212 is displaced the outward swinging of the lever end 222 will cause a downward swinging of the lever end 223 and a depression of the switch plunger effective to break the motor circuit and stop operation of the machine.

It is of course to be understood that the details of structure and the arrangement of parts may be variously changed and modified without departing from the spirit and scope of the invention.

I claim:

1. In a container vacuumizing and closing machine, a rotary turret having a plurality of open bottomed bells thereon each providing a vacuumizing chamber, means for indexing the turret, a container supporting pad underlying each bell, means for effecting a lifting of each pad to seal the associated chamber and position a container therein to be vacuumized and a lowering of said pad to remove the container from the chamber after it is vacuumized, and dash pot means movable with the turret and effective to provide a constant rate of lifting and lowering of each pad throughout the whole of the lifting and lowering movement thereof and comprising an upright tube movable with each pad having an open top and filled with liquid to a depth greater than the amount of lifting and lowering movement of the pads, and a rod fixedly secured on the turret and extending down into each tube and having thereon a head immersed in the liquid therein and predetermined limited clearance for liquid to pass from one side to the other of the head as the respective tube moves relative to said head.

2. In a container vacuumizing and closing machine, a rotary turret having a plurality of open bottomed bells thereon each providing a vacuumizing chamber, means for indexing the turret, a container supporting pad underlying each bell, fluid pressure actuated means for lifting each pad for effecting a lifting thereof to seal the associated chamber and position a container therein, means for releasing each pad after the vacuumizing and closing of a container to permit the pad to drop by gravity, and means movable with the turret and effective to cushion the fall of said pad throughout the full extent of the downward movement thereof.

3. In a container vacuumizing and closing machine, a rotary turret having a plurality of open bottomed bells thereon each providing a vacuumizing chamber, means for indexing the turret, a container supporting pad underlying each bell, fluid pressure actuated means for lifting each pad for effecting a lifting thereof to seal the associated chamber and position a container therein, means for releasing each pad after the vacuumizing and closing of a container to permit the pad to drop by gravity, and dash-pot means movable with the turret and effective to cushion the fall of said pad throughout the full extent of the downward movement thereof.

4. In a container vacuumizing and closing machine, a rotary turret having a plurality of open bottomed bells thereon each providing a vacuumizing chamber, means for indexing the turret, a container supporting pad underlying each bell, fluid pressure actuated means for lifting each pad for effecting a lifting thereof to seal the associated chamber and position a container therein, means for releasing each pad after the vacuumizing and closing of a container to permit the pad to drop by gravity, and dash-pot means movable with the turret and effective to control the rate of lift and the rate of fall of said pad throughout the full extent of each rise and fall thereof.

5. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell and having piston and cylinder connection with the turret, means for evacuating each cylinder to effect a lifting of the respective pad to contact the respective bell bottom and seal the associated chamber and position a container therein and to hold the pad in said chamber sealing position, means for evacuating the sealed chambers, means for closing the containers while they are in the evacuated chambers, means for breaking the vacuum in the cylinders to allow the pads to gravitate to their initial lowered positions, and means movable with the turret and effective for cushioning the fall of each said pad throughout the full extent of the downward movement thereof.

6. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell and having piston and cylinder connection with the turret, means for evacuating each cylinder to effect a lifting of the respective pad to contact the respective bell bottom and seal the associated chamber and position a container therein and to hold the pad in said chamber sealing position, means for evacuating the sealed chambers, means for closing the containers while they are in the evacuated chambers, means for breaking the vacuum in the cylinders to allow the pads to gravitate to their initial lowered positions, and dash-pot means movable with the turret and effective to control the rate of lift and the rate of fall of each said pad throughout the full extent of each rise and fall thereof.

7. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell, means for effecting a lifting of each pad to seal the associated chamber and position a container therein, means for evacuating the sealed chambers, means for closing the containers while they are in the evacuated chambers, means for effecting a lowering of each pad after the vacuumizing and closing of the container thereon has been completed, and means effective upon a happening of either a jamming of the closing means or failure of a complete lowering of a pad for automatically discontinuing operation of the machine and including a control element engageable and displaceable by each pad as it is lowered at the station preceding the discharge station and held displaced by each pad while approaching and until it leaves said discharge station, and control devices operable by said control element to bring about a stoppage of the machine each time said control element is not held displaced by a pad at said discharge station or at said station preceding the discharge station.

8. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell, means for effecting a lifting of each pad to seal the associated chamber and position a container therein, means for evacuating the sealed chambers, means for closing the containers while they are in the evacuated chambers, means for effecting a lowering of each pad after the vacuumizing and closing of the container thereon has been completed, and means effective upon failure of a complete lowering of a pad for automatically discontinuing operation of the machine and including a control element engageable and displaceable by each pad as it is lowered at the station preceding the discharge station and held displaced by each pad while approaching and until it leaves said discharge station, and control devices operable by said control element to bring about a stoppage of the machine each time said control element is not held displaced by a pad at said discharge station or at said station preceding the discharge station.

9. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell, means for effecting a lifting of each pad to seal the associated chamber and position a container therein, means for evacuating the sealed chambers, means for closing the containers while they are in the evacuated chambers, means for effecting a lowering of each pad after the vacuumizing and closing of the container thereon has been completed, and means effective upon failure of a complete lowering of a pad for automatically discontinuing operation of the machine, said last named means including an electric circuit controlling operation of the machine and having a normally open switch connected therein, a track segment extending beneath the station preceding the discharge station and to at least slightly beneath the discharge station in position to be engaged and held depressed by contact of properly lowered pads, said segment when depressed contacting and holding said normally open switch closed to complete the control circuit, and means normally tending to lift said segment and effective whenever a pad leaving the discharge station moves out of contact therewith and the succeeding pad is not fully lowered to lift said segment and permit the switch to open and break the control circuit.

10. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell, each said pad having a support tube extending upwardly therefrom and having a piston head at its upper end, said turret having a cylinder for slidably receiving each piston head, means for evacuating each cylinder at the container receiving station to effect a lifting of the respective pad and a sealing of the associated chamber and positioning of a container therein, means for evacuating the sealed chambers and the containers therein, means for closing the vacuumized containers, means for breaking the vacuum in each cylinder after the container in the associated chamber has been closed to allow the associated pad to gravitate to its initial lowered position, each said support tube having a column of liquid therein, and a rod depending from the turret into each support tube and having a head therein immersed in the liquid column and spaced a limited distance from the surrounding tube walls so as to act in dash-pot fashion to control the rate of lifting and lowering of the associated pad.

11. A machine as defined in claim 10 in which is included a chamber connected by individual ducts to the several cylinders beneath the pistons therein so as to relieve vacuum beneath the pistons and act as a receptacle for any liquid finding its way out of the tubes into the lower ends of said cylinders.

12. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell, each said pad having a support member extending upwardly therefrom and having a piston head at its upper end, said turret having a cylinder for slidably receiving each piston head, means for evacuating each cylinder at the container receiving station to effect a lifting of the respective pad and a sealing of the associated chamber and positioning of a container therein, means for evacuating the sealed chambers and the containers therein, means for closing the vacuumized containers, and means for breaking the vacuum in each cylinder after the container in the associated chamber has been closed to allow the associated pad to gravitate to its initial lowered position, said cylinder evacuating means including a duct into register with which each cylinder moves as it is indexed to the receiving station, a valve controlling connection of the duct with an evacuating source, and cam means operating in timed relation with said indexing means to open said valve and evacuate said duct during each stationary interval of said turret.

13. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell, each said pad having a support member extending upwardly therefrom and having a piston head at its upper end, said turret having a cylinder for slidably receiving each piston head, means for evacuating each cylinder at the container receiving station to effect a lifting of the respective pad and a sealing of the associated chamber and positioning of a container therein, means for evacuating the sealed chambers and the containers therein, means for closing the vacuumized containers, and means for breaking the vacuum in each cylinder after the container in the associated chamber has been closed to allow the associated pad to gravitate to its initial lowered position, said turret including a ring portion closing all said cylinders and having openings therethrough of limited diameter at the position of each cylinder, said cylinder evacuating means including a duct disposed to register with each cylinder as it is indexed to the receiving station, a stationary cylinder having a plunger slidably mounted therein and in slide contact with said ring portion and through which said duct extends for registry with the cylinder openings, and diaphragm means supporting the plunger, said plunger and diaphragm being acted upon by atmospheric pressure to hold the plunger against said ring portion during the evacuation of each cylinder.

14. A machine as defined in claim 13 in which each pad support member comprises a tube having a column of liquid therein, and in which is included a rod depending from the cylinder closing ring into each tube and having a head thereon immersed in the liquid column and spaced a limited distance from the surrounding tube walls so as to act in dash-pot fashion to control the rate of lifting and lowering of the associated pad.

15. In a machine of the character described wherein is provided a turret having a plurality of container supporting pads, means to index the turret to present the pads serially at a container receiving station a container closing station and a container discharging station; means for feeding containers to said receiving station, a pusher, means for reciprocating the pusher in timed relation to the indexing of the turret for pushing containers off said feeding means onto a pad at rest at the receiving station, and means rendering said pusher reciprocating means ineffective except when a container is present on said feeding means at said receiving station, said last named means including a constantly reciprocated member, a pusher actuating member, and means actuated by contact of a container on the feed means opposite the receiving station for effecting a connection of the pusher actuating member for movement with said constantly reciprocated member.

16. A machine as defined in claim 15 in which there is included a discharging pusher for discharging containers from the pads at the discharging station, and means for imparting movement to said discharging pusher from the constantly reciprocated member.

17. In a machine of the character described wherein is provided a turret having a plurality of container supporting pads, means to index the turret to present the pads serially at a container receiving station a container closing station and a container discharging station; means for feeding containers to said receiving station, a pusher, means for reciprocating the pusher in timed relation to the indexing of the turret for pushing containers off said feeding means onto a pad at rest at the receiving station, a constantly reciprocated member, a pusher actuating member, means for causing said members to move together in a direction for retracting the pusher, and means for causing said members to move together in a direction for projecting the pusher to push a container onto a supporting pad only when a container is on the feeding means opposite the receiving station.

18. In a machine of the character described wherein is provided a turret having a plurality of container supporting pads, means to index the turret to present the pads serially at a container receiving station a container closing station and a container discharging station; means for feeding containers to said receiving station, a pusher, means for reciprocating the pusher in timed relation to the indexing of the turret for pushing containers off said feeding means onto a pad at rest at the receiving station, a constantly reciprocated member, a pusher actuating member, means for causing said members to move together in a direction for retracting the pusher, cooperatively engaging latch means normally effective to cause said members to move together in a direction for projecting the pusher to push a container onto a supporting pad, and means for tripping and releasing said latch means when no container is positioned on the feeding means opposite the receiving station.

19. In a machine of the character described wherein is provided a turret having a plurality of container supporting pads, means to index the turret to present the pads serially at a container receiving station a container closing station and a container discharging station; means for feeding containers to said receiving station, a pusher, means for reciprocating the pusher in timed relation to the indexing of the turret for pushing containers off said feeding means onto a pad at rest at the receiving station, a constantly reciprocated member, a pusher actuating member, means for causing said members to move together in a direction for retracting the pusher, cooperatively engaging latch means effective to cause said members to move together in a direction for projecting the pusher to push a container into a supporting pad, means normally effective to trip and release said latch means and prevent movement together of said members, and means operated by movement of a container on said feeding means to a position opposite the receiving station for displacing said latch tripping means and rendering the latch means effective to cause the members to move together and push said container onto the pad at the receiving station.

20. In a vacuumizing and closing machine, a turret including a plurality of bells having openings through which to receive containers to be vacuumized and closed and wall openings through which said bells can be evacuated, means for closing the container receiving openings, means for indexing the turret, a bell evacuating port overlying the path of travel of the bell wall openings and through which the bells are initially evacuated as they are serially brought into communication with said port, an arcuate duct spaced from the port and disposed to communicate simultaneously with a plurality of bell wall openings for maintaining in the bells the evacuated condition desired during closing of containers, means for evacuating the port and the duct including a line connecting said port and duct, a vacuum source line connected with said connecting line, and valve means in said connecting line in position for being effective for isolating the port from the duct whenever the negative pressure condition between said valve and said duct is predominant, thereby to avoid subjecting said duct to wide fluctuations in negative pressure at the port brought about incidental to the successive evacuations of serially presented bells.

21. In a vacuumizing and closing machine, a turret including a plurality of bells having openings through which to receive containers to be vacuumized and closed and wall openings through which said bells can be evacuated, means for closing the container receiving openings, means for indexing the turret, a bell evacuating port overlying the path of travel of the bell wall openings and through which the bells are initially evacuated as they are serially brought into communication with said port, an arcuate duct spaced from the port and disposed to communicate simultaneously with a plurality of bell wall openings for maintaining in the bells the evacuated condition desired during closing of containers, and means for evacuating the port and the duct thereby to avoid subjecting the duct to wide fluctuations in negative pressure at the port brought about incidental to the successive initial evacuations of serially presented bells, said last named means comprising a single vacuum source line, a branch line leading from said source line to said port, a second branch line leading from said source line to said duct, and a valve in said second branch line and automatically closable whenever the negative pressure condition between said valve and said duct is predominant.

22. In a machine of the character described, a turret having thereon a plurality of chamber forming bells and cooperating container supporting pads, means for bringing the pads and the bells together for closing containers in the bells, a single conveyor for feeding containers to and from the machine, means for pushing the containers one by one off the conveyor onto said pads, means for pushing closed containers off said pads back onto said conveyor, an electric motor for driving the machine parts, and means for automatically stopping the machine upon occurrence of a jam incident to a pushing of a container onto or from a pad, said last named means comprising a lever movable as a part of driving connections for said pusher means and including two parts relatively movable but yieldably constrained to move together by a spring detent carried by one part and engaging the other part and releasable upon imposition of an overload to permit one part to move relative to the other, and a motor cutout switch actuated to break the motor circuit upon overload displacement of said detent.

23. A machine as defined in claim 22 in which the driving power is derived from an electric motor, and said constantly reciprocated member comprises a lever composed of two parts and a spring detent carried by one part and engaging in a socket in the other part and effective to normally cause the two parts to move together but which is displaceable on imposition of an overload to permit one part to move relative to the other part without driving effect, a normally closed motor circuit control switch, and means operated upon displacement of the detent for opening the switch and discontinuing operation of the machine.

24. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell, each said pad having a support member extending upwardly therefrom and having a piston head at its upper end, said turret having a cylinder for slidably receiving each piston head, means for evacuating each cylinder at the container receiving station to effect a lifting of the respective pad and a sealing of the associated chamber and positioning of a container therein, means for evacuating the sealed chambers and the containers therein, means for closing the vacuumized containers, and means for breaking the vacuum in each cylinder after the container in the associated chamber has been closed to allow the associated pad to gravitate to its initial lowered position, said cylinder evacuating means including a duct into register with which each cylinder moves as it is indexed to the receiving station, a valve controlling connection of the duct with an evacuating source, cam means operating in timed relation with said indexing means to open said valve and evacuate said duct during each stationary interval of said turret, and an arcuate vacuum duct extending from adjacent to said duct to a point approximating said vacuum breaking means and effective to hold the container support pads in elevated position.

25. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell and having piston and cylinder connection with the turret, means for evacuating each cylinder to effect a lifting of the respective pad to contact the respective bell bottom and seal the associated chamber and position a container therein and to hold the pad in said chamber sealing position, means for evacuating the sealed chambers, means for closing the containers while they are in the evacuated chambers, means for breaking the vacuum in the cylinders to allow the pads to gravitate to their initial lowered positions, said individual bells having evacuating wall openings therein and said chamber evacuating means including an arcuate duct with which said wall openings communicate and which is formed to extend over the positions of several said bell wall openings to complete and maintain the degree of vacuum in the communicating bells desired at the time the containers therein are sealed, and a vacuumizing port disposed in advance of and spaced from said duct to communicate with the bells as they are individually presented for initially evacuating the bells.

26. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell and having piston and cylinder connection with the turret, means for evacuating each cylinder to effect a lifting of the respective pad to contact the respective bell bottom and seal the associated chamber and position a container therein and to hold the pad in said chamber sealing position, means for evacuating the sealed chambers, means for closing the containers while they are in the evacuated chambers, and means for breaking the vacuum in the cylinders to allow the pads to gravitate to their initial lowered positions, said individual bells having evacuating wall openings therein and said chamber evacuating means including an arcuate duct with which said wall openings communicate and which is formed to extend over the positions of several said bell wall openings to complete and maintain the degree of vacuum in the communicating bells desired at the time the containers therein are sealed, and a vacuumizing port disposed in advance of and spaced from said duct to communicate with the bells as they are individually presented for initially evacuating the bells, a single source vacuum line, a branch line communicating between the single source line to both of said arcuate duct and said port, and valve means in said branch line and effective for preventing communication to the arcuate duct of wide negative pressure fluctuations incidental to the initial evacuation of bells.

27. A container vacuumizing and closing machine comprising a turret having a plurality of open bottomed bells each providing a vacuumizing chamber, means for indexing the turret to present the bells serially at a plurality of stations including a container receiving station, a container closing station and a container discharging station, a container supporting pad underlying each bell and having piston and cylinder connection with the turret, means for evacuating each cylinder to effect a lifting of the respective pad to contact the respective bell bottom and seal the associated chamber and position a container therein and to hold the pad in said chamber sealing position, means for evacuating the sealed chambers, means for closing the containers while they are in the evacuated chambers, means for breaking the vacuum in the cylinders to allow the pads to gravitate to their initial lowered positions, said individual bells having evacuating wall openings therein and said chamber evacuating means including an arcuate duct with which said wall openings communicate and which is formed to extend over the positions of several said bell wall openings to complete and maintain the degree of vacuum in the communicating bells desired at the time the containers therein are sealed, and a vacuumizing port disposed in advance of and spaced from said duct to communicate with the bells as they are individually presented for initially evacuating the bells, a single source vacuum line, a branch line communicating between the single source line to both of said arcuate duct and said port, valve means in said branch line and effective for preventing communication to the arcuate duct of wide negative pressure fluctuations incidental to the initial evacuation of bells, an arcuate duct overlying the path of travel of the cylinders and of a length for communicating simultaneously with a plurality of cylinders, a regulator valve in said single source line in advance of said branch lines, a vacuum line connected with the cylinder communicating arcuate duct, and means for connecting said last mentioned line with the single source line in advance of said regulator valve or with the bell communicating arcuate duct connected branch line.

28. A container vacuumizing and closing machine comprising a turret having a plurality of open bottomed bells each providing a vacuumizing chamber, means for indexing the turret to present the bells serially at a plurality of stations including a container receiving station a container closing station and a container discharging station, a container supporting pad underlying each bell and having piston and cylinder connection with the turret, means for evacuating each cylinder to effect a lifting of the respective pad to contact the respective bell bottom and seal the associated chamber and position a container therein and to hold the pad in said chamber sealing position, means for evacuating the sealed chambers, means for closing the containers while they are in the evacuated chambers, means for breaking the vacuum in the cylinders to allow the pads to gravitate to their initial lowered positions, said individual bells having evacuating wall openings therein and said chamber evacuating means including an arcuate duct with which said wall openings communicate and which is formed to extend over the positions of several said bell wall openings to complete and maintain the degree of vacuum in the communicating bells desired at the time the containers therein are sealed, and a vacuumizing port disposed in advance of and spaced from said duct to communicate with the bells as they are individually presented for initially evacuating the bells, a single source vacuum line, a branch line communicating between the single source line to both of said arcuate duct and said port, valve means in said branch line and effective for preventing communication to the arcuate duct of wide negative pressure fluctuations incidental to the initial evacuation of bells, an arcuate duct overlying the path of travel of the cylinders and of a length for communicating simultaneously with a plurality of cylinders, a regulator valve in said single source line in advance of said branch lines, a vacuum line connected with the cylinder communicating arcuate duct, and means for connecting said last mentioned line with the single source line in advance of said regulator valve or with the bell communicating arcuate duct connected branch line, and said cylinder evacuating and pad lifting means comprising a port overlying the path of travel of the cylinders and spaced in advance of the cylinder communicating arcuate duct and which is connected by a line with said single source line.

29. A container vacuumizing and closing machine comprising a turret having a plurality of open bottomed bells each providing a vacuumizing chamber, means for indexing the turret to present the bells serially at a plurality of stations including a container receiving station, a container closing station and a container discharging station, a container supporting pad underlying each bell and having piston and cylinder connection with the turret, means for evacuating each cylinder to effect a lifting of the respective pad to contact the respective bell bottom and seal the associated chamber and position a container therein and to hold the pad in said chamber sealing position, means for evacuating the sealed chambers, means for closing the containers while they are in the evacuated chambers, means for breaking the vacuum in the cylinders to allow the pads to gravitate to their initial lowered positions, said individual bells having evacuating wall openings therein and said chamber evacuating means including an arcuate duct with which said wall openings communicate and which is formed to extend over the positions of several said bell wall openings to complete and maintain the degree of vacuum in the communicating bells desired at the time the containers therein are sealed, and a vacuumizing port disposed in advance of and spaced from said duct to communicate with the bells as they are individually presented for initially evacuating the bells, a single source vacuum line, a branch line communicating between the single source line to both of said arcuate duct and said port, valve means in said branch line and effective for preventing communication to the arcuate duct of wide negative pressure fluctuations incidental to the initial evacuation of bells, an arcuate duct overlying the path of travel of the cylinders and of a length for communicating simultaneously with a plurality of cylinders, a regulator valve in said single source line in advance of said branch lines, a vacuum line connected with the cylinder communicating arcuate duct, and means for connecting said last mentioned line with the single source line in advance of said regulator valve or with the bell communicating arcuate duct connected branch line, and said cylinder evacuating and pad lifting means comprising a port overlying the path of travel of the cylinders and spaced in advance of the cylinder communicating arcuate duct and which is connected by a line with said single source line, a valve in said last mentioned line, and means for opening the valve each time the turret comes to rest with a cylinder in communication with said last mentioned port.

30. In a machine of the character described, a turret having thereon a plurality of chamber forming bells disposed with their open bottoms at a fixed level, a plurality of container supporting pads individually movable vertically between a constantly fixed lowered container receiving position and a lifted bell bottom sealing position, means for effecting a lifting of each pad and a container thereon for enclosing the container in a bell and sealing the bell and then a lowering of each said pad with the container thereon, a removable and replaceable adapter on each pad of a size selected in accordance with the size of containers being processed and including a horizontal container receiving and supporting surface, a single conveyor for feeding containers to the machine and from the machine, means for pushing the containers one by one off the conveyor onto the supporting surfaces of the adapters on said pads, means for pushing containers off the pads back onto said conveyor, support means for said conveyor, and means for lifting and lowering said support means to line up the conveyor with the selected sizes of adapters.

31. Machine structure as defined in claim 30 in which the conveyor lifting and lowering means comprises a plurality of support columns depending from the conveyor support means and each threaded through a captive worm wheel, a single adjuster shaft having a worm gear connection with each of the worm wheels, and a hand wheel on said shaft for imparting rotation thereto and simultaneously effecting a lifting or lowering of said support columns accordingly as said hand wheel is turned in one direction or the other.

32. In a machine of the character described a turret having thereon a plurality of chamber forming bells and cooperating container supporting pads, means for lifting the pads to enclose containers in the bells and then lower said pads with the containers thereon, a single conveyor for feeding containers to and from the machine, an electric motor for driving the machine parts, a motor control circuit including a motor cutout switch, reciprocable pusher means for pushing unsealed containers one-by-one off the conveyor and onto the pads and closed containers off said pads back onto said conveyor, and means for moving said pusher means and including a member movable with the pusher means during the pushing of a container thereby and free to move relative to said pusher means in case of a jamming of the pusher means and engageable with said switch during such relative movement to break the control circuit and stop the machine.

ALFRED L. KRONQUEST.

REFERENCES CITED

The following references are of record in the file of this patent:

UNITED STATES PATENTS

| Number | Name | Date |
|---|---|---|
| 691,537 | Ericson | Jan. 21, 1902 |
| 714,875 | Doble | Dec. 2, 1902 |
| 762,551 | Norton | June 14, 1904 |
| 895,266 | Hehr et al. | Aug. 4, 1908 |
| 938,578 | Gull | Nov. 2, 1909 |
| 956,286 | Champ | Apr. 26, 1910 |
| 1,247,722 | Rogers et al. | Nov. 27, 1917 |
| 1,384,599 | Chamberlain | July 12, 1921 |
| 1,395,915 | Haines | Nov. 1, 1921 |
| 1,413,996 | Sanborn | Apr. 25, 1922 |
| 1,580,193 | Fooks | Apr. 13, 1926 |
| 1,607,269 | Malmquist | Nov. 16, 1926 |
| 1,635,237 | Townsend | July 12, 1927 |
| 1,651,865 | Blake | Dec. 6, 1927 |
| 1,874,854 | Bardet et al. | Aug. 30, 1932 |
| 1,891,851 | Troyer et al. | Dec. 20, 1932 |
| 1,893,716 | Ronzone | Jan. 10, 1933 |
| 1,895,184 | Douglass et al. | Jan. 24, 1933 |
| 1,965,246 | Meyer | July 3, 1934 |
| 1,998,462 | Le Frank | Apr. 23, 1935 |
| 2,043,969 | Kutchera | June 9, 1936 |
| 2,070,616 | Nordquist | Feb. 16, 1937 |
| 2,090,129 | Kimball et al. | Aug. 17, 1937 |
| 2,113,798 | Mullan | Apr. 12, 1938 |
| 2,119,665 | Cameron | June 7, 1938 |
| 2,124,581 | Luthi | July 26, 1938 |
| 2,136,901 | Ferguson | Nov. 15, 1938 |
| 2,302,693 | Hoar | Nov. 24, 1942 |
| 2,309,859 | Mojonnier et al. | Feb. 2, 1943 |
| 2,359,082 | Boylan | Sept. 26, 1944 |
| 2,394,737 | Allen | Feb. 12, 1946 |
| 2,405,232 | Nordquist | Aug. 6, 1946 |